(12) United States Patent
Kawaguchi et al.

(10) Patent No.: US 8,555,401 B2
(45) Date of Patent: Oct. 8, 2013

(54) CONTENT PROVISION SYSTEM

(75) Inventors: Kinji Kawaguchi, Kawasaki (JP); Masahiko Ohashi, Kawasaki (JP); Yu Minakuchi, Kawasaki (JP); Tomotaka Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/345,167

(22) Filed: Jan. 6, 2012

(65) Prior Publication Data

US 2012/0216289 A1   Aug. 23, 2012

(30) Foreign Application Priority Data

Feb. 23, 2011   (JP) ................................. 2011-037525

(51) Int. Cl.
*H04L 9/32*   (2006.01)
(52) U.S. Cl.
USPC .................................. 726/26; 726/27; 726/28
(58) Field of Classification Search
USPC .............. 380/200–202; 726/26–30; 713/163, 713/165, 167, 189; 705/51, 57–59
See application file for complete search history.

(56) References Cited

U.S. PATENT DOCUMENTS

| 6,983,371 | B1* | 1/2006 | Hurtado et al. | 713/189 |
| 7,191,332 | B1* | 3/2007 | Pankajakshan et al. | 713/163 |
| 7,277,870 | B2* | 10/2007 | Mourad et al. | 705/51 |
| 2005/0177851 | A1 | 8/2005 | Murao et al. | |
| 2008/0243696 | A1 | 10/2008 | LeVine | |

FOREIGN PATENT DOCUMENTS

| JP | 2003-244769 | | 8/2003 |
| JP | 2008-282393 | A | 11/2008 |

* cited by examiner

*Primary Examiner* — Hosuk Song
(74) *Attorney, Agent, or Firm* — Fujitsu Patent Center

(57) ABSTRACT

The second content provision system determines, in response to a request by a user from a second terminal belonging to a second network, a second content being a same content as a first content, which is provided to the first terminal belonging to a first network or an alternative content for the first content and matching rights of the user. The second content is provided from the second network to the second terminal and can be used by the second terminal. The second content is determined by using content information specifying the first content which is in-use or which the use has interrupted and ownership information indicating the rights of the user and the content provision system acquires the content information and the ownership information from the first content provision system in response to the request from the second terminal.

14 Claims, 24 Drawing Sheets

FIG.9

SERVICE CONTINUANCE INFORMATION TABLE (HOME)

| USER ID | CONTENT INFORMATION | | | | VIEWING START TIME |
|---|---|---|---|---|---|
| | CONTENT (ID) | SERVICE | DISTRIBUTOR | SERVICE NAME | |
| User01 | PRO BASEBALL TRANSMISSION (STARTS 18:00 7/30/2010, TEAM A VS. TEAM B) | TELEVISION BROADCAST | CATV-A | CHANNEL-1 | 2010/07/30: 18:00:30 |
| | | | | | |
| | | | | | |

SERVICE CONTINUANCE INFORMATION TABLE (FOREIGN)

| USER ID | CONTENT INFORMATION | | DISTRIBUTOR | SERVICE NAME | VIEWING START TIME |
|---|---|---|---|---|---|
| | CONTENT (ID) | SERVICE | | | |
| User01 | PRO BASEBALL TRANSMISSION (STARTS 18:00 7/30/2010, TEAM A VS. TEAM B) | VOD | DISTRIBUTOR A | AA ON DEMAND | 2010/08/01 20:11:10 |
| | | | | | |
| | | | | | |

RIGHTS TABLE 72

| LICENSE 1 (RB) | |
|---|---|
| LICENSEE | USER 1 (USER ID) |
| RIGHTS | OBTAIN |
| PERMISSION 1 (R11) | |
| LICENSEE | USER 1 (USER ID) |
| RIGHTS | PLAY |
| RESOURCE (CONTENT ID) | CATV-A PRO BASEBALL TRANSMISSION (2010/7/30 18:00 START TEAM A VS. TEAM B) |
| CONDITION | ONCE |
| PERMISSION 2 (R21) | |
| LICENSEE | USER 1 (USER ID) |
| RIGHTS | PLAY |
| RESOURCE (CONTENT ID) | AA ON DEMAND PRO BASEBALL TRANSMISSION (2010/7/30 18:00 START TEAM A VS. TEAM B) |
| CONDITION | THREE DAYS |
| ISSUED BY | CLEARING HOUSE DD |

FIG.13

CONTENT ROUTING TABLE (HOME) ~73

| CONTENT (CONTENT ID) | SERVICE | DISTRIBUTOR | SERVICE NAME | TERMINAL | MEDIA | WAVEBAND | CONGESTION/PROBLEM |
|---|---|---|---|---|---|---|---|
| PRO BASEBALL TRANSMISSION (2010/7/30 18:00 START TEAM A VS. TEAM B) | TV BROADCAST | CATV-A | CHANNEL-1 | STB | - | - | - |
| MAJOR LEAGUE TRANSMISSION (2010/08/02 2:45 START TEAM C VS. TEAM D) | TV BROADCAST | CATV-A | CHANNEL-1 | STB | - | - | - |

FIG.14

CONTENT ROUTING TABLE (FOREIGN) — 74

| CONTENT | SERVICE | DISTR-IBUTOR | SERVICE NAME | TERMI-NAL | MEDIA | BAND | C/F |
|---|---|---|---|---|---|---|---|
| PRO BASEBALL GAME(2010/7/30 18:00 START TEAM A VS. TEAM B) | VOD | A | AA ON DEMAND | PC | WMV | 1.5 Mb/s | — |
| PRO BASEBALL GAME(2010/7/30 18:00 START TEAM A VS. TEAM B) | VOD | A | BB SPORTS | PC | WMV | 1.5 Mb/s | OCC-URR-ING |
| PRO BASEBALL GAME(2010/7/30 18:00 START TEAM A VS. TEAM B) | TEXT RELAY | A | BB SPORTS | PC | TEXT | 128 kb/s | — |
| PRO BASEBALL GAME(2010/7/30 18:00 START TEAM A VS. TEAM B) | IP BROAD-CAST | A | CHANNEL-1 | STB | MEPG-4 | 14 Mb/s | — |
| MAJOR LEAGUE GAME (2010/08/02 2:45 START TEAM C VS. TEAM D) | IP BROAD-CAST | A | CHANNEL-1 | STB | MEPG-4 | 14 Mb/s | — |
| MAJOR LEAGUE GAME(2010/08/02 2:45 START TEAM C VS. TEAM D) | VOD | A | AA ON DEMAND | PC | WMV | 1.5 Mb/s | — |

FIG.15

TERMINAL MANAGEMENT TABLE 75

| VIEWING TERMINAL ID | TERMINAL TYPE | PLAYER | RENDERER | ALLOWABLE DELIVERY BAND | ADAPTIVE MEDIA | VIEWING METHOD |
|---|---|---|---|---|---|---|
| C8240 | PC | WMP V-11 | - | - | WMV | - |
| C8240 | PC | Flash Player 10 | - | - | Flash Video | - |
| | | | | | | |
| | | | | | | |

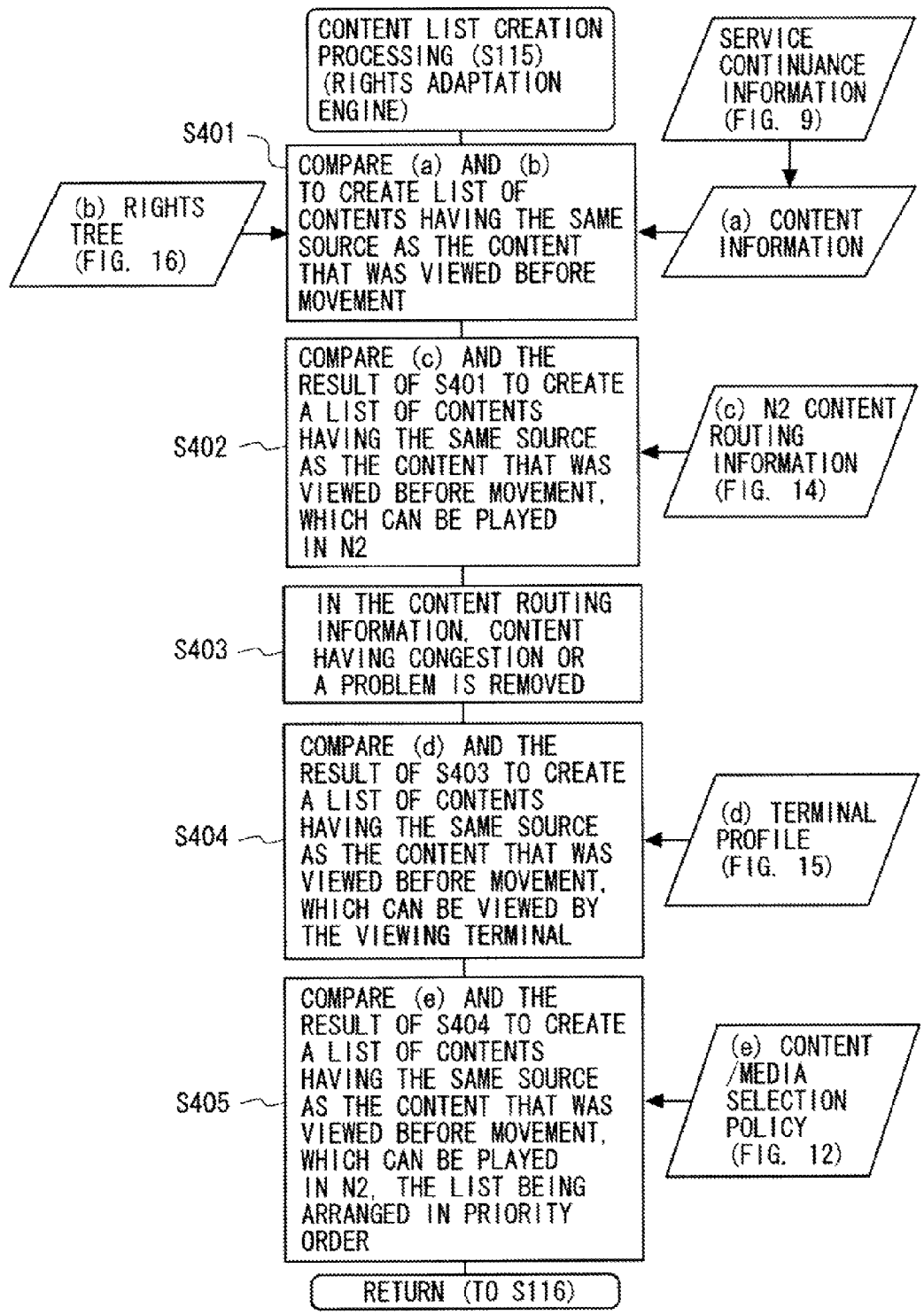

CONTENT PROVISION SYSTEM

CROSS-REFERENCE TO RELATED APPLICATION

This application is based upon and claims the benefit of priority of the prior Japanese Patent Application No. 2011-037525, filed on Feb. 23, 2011, the entire contents of which are incorporated herein by reference.

FIELD

The invention relates to a content provision system.

BACKGROUND

Conventionally, there is technology in which rights held by a user in relation to digital content (hereinafter, simply called "content") are managed by a rights management system on a network, the rights management system issues a license for rights relating to the content to a terminal device of the user via the network and allows the user to use of the content corresponding to the rights. The rights relating to content may include, for example, rights to obtain the content, rights to play the content, rights to print the content, and so on.

In the prior art, there exists technology which permits a user who has received a license from a rights management server on a network and has received the provision of content via the network, using a specific terminal device, to continuing using the content after the user has moved location, by accessing the rights management server via another network at the movement destination, by using another terminal device at the movement destination.

Furthermore, there is also technology which permits a user who has received a license from a rights management server on a network and has received distribution of content from a specific distributor, using a specific terminal device, to continue using the content after the user has moved, by accessing the rights management server from another network at the movement destination, using another terminal device at the movement destination, and receiving distribution of the content from another distributor which is associated with the specific distributor.

[Patent document 1] Japanese Patent Application Publication No. 2008-282393

[Patent document 2] Japanese Patent Application Publication No. 2003-244769

However, in the prior art technology described above, there have been the following failures.

Firstly, if the same distributor or another, associated, distributor does not distribute substantially the same content in the other network at the movement destination, then the user has not been able to continue using the content.

Secondly, a user has had to search for content which is substantially the same as the content used at the location before moving, using another terminal device and another network at the movement destination, and has had to carry out procedures including licensing for using the content, himself or herself.

SUMMARY

One aspect of the invention is a content provision system, including: a first content provision system which, in response to a request by a user from a first terminal belonging to a first network, issues a license in respect of a first content for which the user has use rights, and which provides the first content to the first terminal via the first network; a reception unit which receives a request by the user from a second terminal belonging to a second network that is different from the first network; a specification unit which specifies a second content that can be used by the second terminal, the second content being the same content as the first content or an alternative content for the first content, which matches the rights of the user and can be provided via the second network, using at least content information specifying a first content which is being used by the user, or the use of which the user has interrupted by the first network and the first terminal, and ownership information indicating the rights of the user, as obtained from the first content provision system in response to the request; an issuing unit which issues a license in respect of the second content; and a second content provision system including a provision unit which provides the second content to the second terminal via the second network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 illustrates an example of a data structure of service continuance information (service continuance information table) which is managed by a viewing status management mechanism of the home management system;

FIG. 10 illustrates an example of a data structure of service continuance information (service continuance information table) which is managed by a viewing status management mechanism of the home management system, after the start of viewing at a terminal at a movement destination (terminal device T2);

FIG. 11 illustrates an example of a data structure (rights table) of user rights information which is stored (held) in the ownership DB of the home management system;

FIG. 13 illustrates an example of a data structure of content routing information to the network N1 (a routing table), which is managed by the home management system;

FIG. 14 illustrates an example of a data structure of content routing information to the network N2 (a routing table), which is managed by the foreign management system;

FIG. 15 illustrates an example of a data structure of terminal profile information which is managed by the terminal management system (a terminal management table);

FIG. 26 illustrates an example of the details of the content list creation processing (FIG. 21, step S115) by the rights adaptation engine (FIG. 4).

DESCRIPTION OF THE EMBODIMENT

Below, an embodiment of the invention is described with reference to the drawings. The composition of the embodiment is an example, and the invention is not limited to the composition of the embodiment.

The embodiment describes a system which manages rights relating to digital content (content) as described below, and also issues a license to a user and provides content relating to a license.

(1) Digital rights held by a user (rights relating to the use of digital content) are managed by a digital rights management server (home) on a network to which the user belongs. When the user moves between networks, the digital rights management server (home) authenticates the validity of the license in response to an authentication request from a digital rights management server (foreign) on a network at the movement destination, and even if there is a difference in the services or media between the networks, a license which adapts to the movement destination network is issued to the terminal device at the movement destination.

(2) In the digital rights management system according to this embodiment, the information to be managed and the functions to be provided are as follows.

<1> Storage and management of digital rights information held by users.

<2> Management of individual content and media selection policies based on users' interests and preferences.

Figure 16:
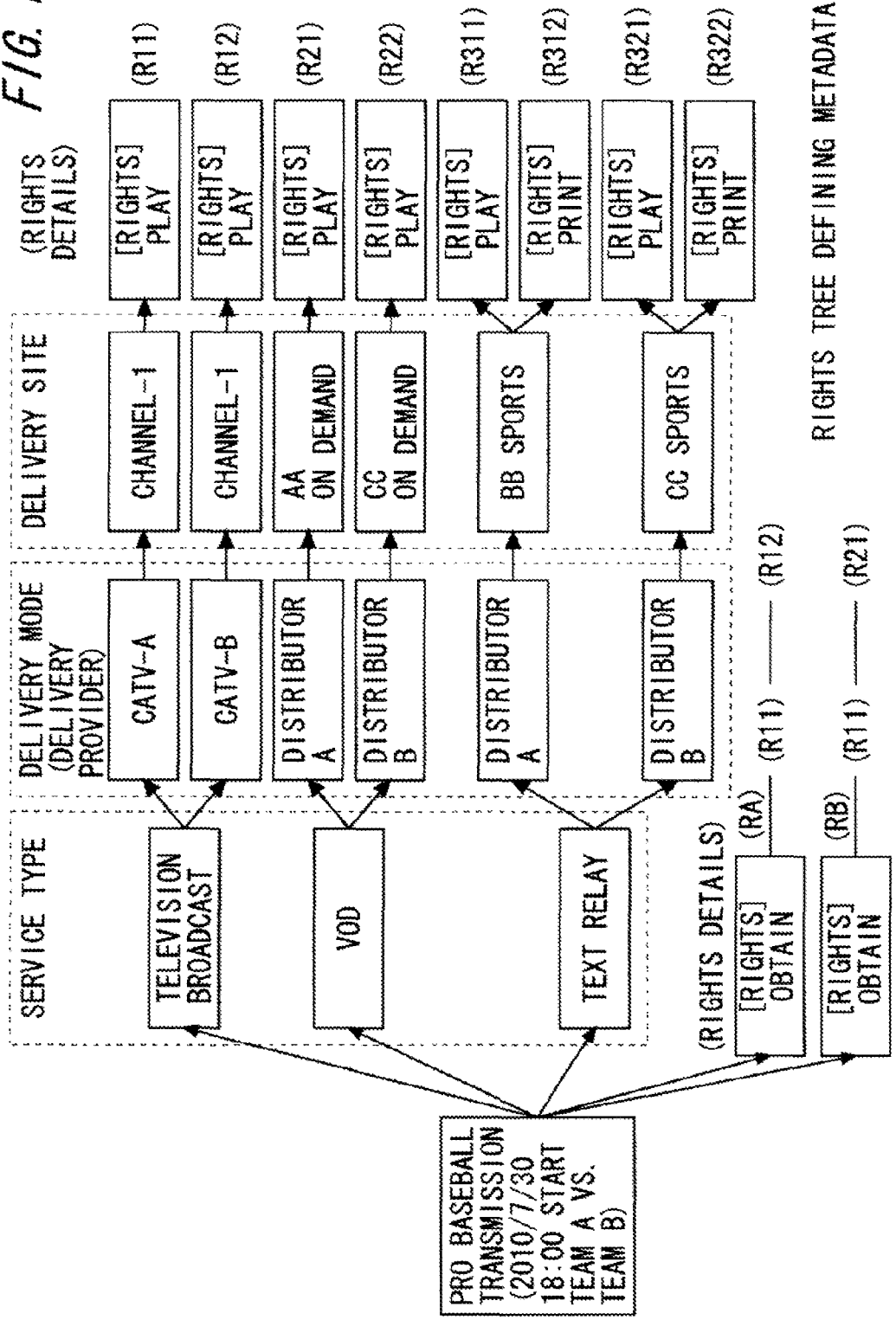
FIG. 16 illustrates a schematic view of rights tree defining metadata which is managed by a clearing house.

<3> Storage and management of the following metadata defining a rights tree (FIG. 16).

(i) Metadata defining a relationship of rights between different contents, different media and different services, which have a same source.

(ii) Metadata defining rights to obtain the rights in (i) above.

<4> Management of content routing information indicating content which can be used on a network.

<5> Selection of content corresponding to the use conditions at a movement destination.

<6> Settlement for acquisition of use rights by exercising acquisition rights in order to be able to use a specified content, or settlement of the balance.

<7> Issuing of licenses corresponding to use conditions at a movement destination.

Example of Network Configuration

Figure 1:
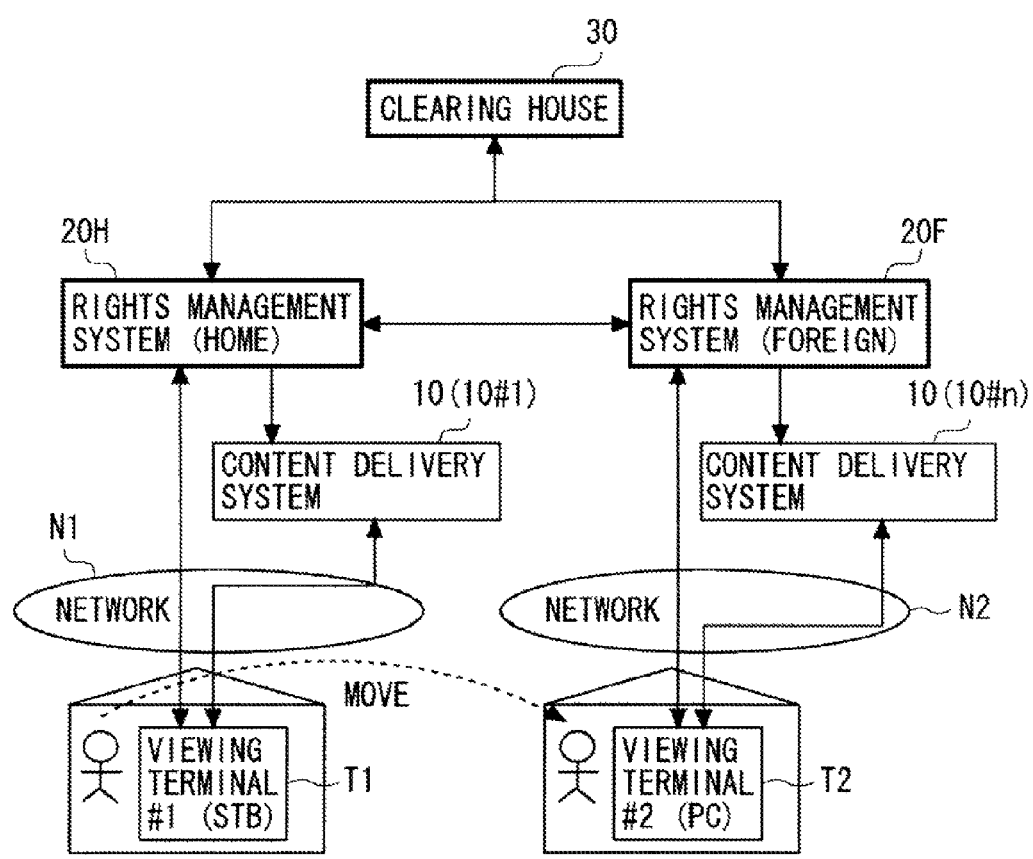
FIG. 1 illustrates an example of a network configuration of a content provision system relating to an embodiment of the invention.

Below, an embodiment of a content provision system including the information and functions illustrated in <1> to <7> above will be described. FIG. 1 illustrates an example of a network configuration of a content provision system relating to the embodiment. In the example illustrated in FIG. 1, there are a first network N1 (home network N1) and a second network N2 (foreign network N2), which is different from the network N1, and the two networks respectively deliver (distribute) content to a user's terminal device.

A content delivery system 10 (10#1) which delivers content to a terminal device via the network N1, and a rights management system (home) 20H (also described as a home management system 20H) which manages rights relating to content delivered by the content delivery system 10#1, are connected to the network N1. In other words, the network N1 includes a home management system 20H and a content delivery system 10#1. In the example in FIG. 1, a terminal device T1 (viewing terminal #1), which is a set-top box (STB), is illustrated as a terminal device (first terminal) which is coupled to (belongs to) the network N1.

On the other hand, a content delivery system 10 (10#n) which delivers content to a terminal device via the network N2, and a rights management system (foreign) 20F (also described as a foreign management system 20F) which manages rights relating to content delivered by the content delivery system 10#n (where n is a natural number apart from 0) are coupled to the network N2. In other words, the network N2 includes a foreign management system 20F and a content delivery system 10#n. In the example in FIG. 1, a terminal device T2 (viewing terminal #2), which is a personal computer (PC), is illustrated as a terminal device (second terminal) which is connected to (belongs to) the network N2.

Moreover, the home management system 20H and the foreign management system 20F are coupled to an upper-level system (upper-level apparatus) which is known as a clearing house 30. Here, a user of the terminal device T1 is issued with a license relating to the use (obtain, play, print, etc.) of content, from the home management system 20H, receives content delivered from the content delivery system 10#1, and is able to use the content (for example, to view the content).

The foreign management system 20F and the content delivery system 10#n are provided in order to provide substantially the same content or alternative content to the user, if the user moves to a position where the terminal device T2 is disposed and wishes to continue using content which the user was using via the terminal device T1, by means of the terminal device T2 and the network N2. The foreign management system 20F issues a license relating to use of the same content or alternative content, to the user, via the terminal device T2. In issuing a license, the foreign management system 20F carries out cooperation processing with the home management system 20H, and also refers to information relating to rights in respect of the content, which are managed by the clearing house 30.

The content delivery system 10#n delivers the same content or the alternative content to the terminal device T2 via the network N2. Two or more content delivery systems 10 can be disposed on each of the network N1 and the network N2. Furthermore, the foreign management system 20F and the content delivery system 10 may be arranged respectively in other networks which are different from the network N1 to which the home management system 20H is coupled. Moreover, it is also possible to provide a plurality of foreign management systems 20F.

Furthermore, a company (content provider: distributor) which delivers (provides) content in the network N1 to which the home management system 20H is coupled (home network) and a company which delivers content in the network N2 (foreign network) may be the same company or different companies (associated companies).

Furthermore, various terminal devices other than an STB or a PC may be used, such as a work station (WS), a PDA (Personal Digital Assistant), a mobile phone (e.g., a cell phone, a smart phone), or the like. In other words, the transmission path between the network N1 (N2) and the terminal device may be wired, or may be wireless.

Figure 2:
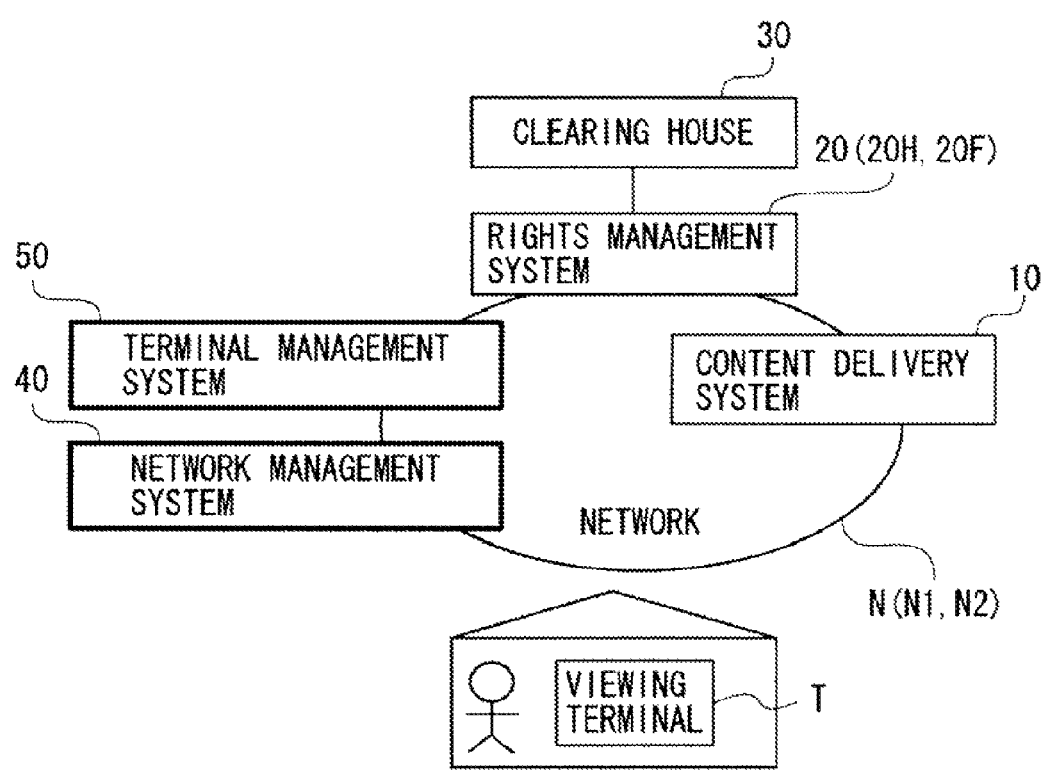
FIG. 2 is an illustrative diagram showing constituent elements relating to content delivery in a network.

FIG. 2 is an illustrative diagram depicting the constituent elements relating to content delivery in a network N. In an example illustrated in FIG. 2, the network N corresponds to the networks N1 and N2 illustrated in FIG. 1, and the terminal device (viewing terminal) T corresponds to the terminal devices T1 and T2 illustrated in FIG. 1. A content delivery system 10 such as that illustrated in FIG. 1 (corresponding to 10#1, 10#n) and a rights management system 20 (corresponding to 20H and 20F) are coupled to the network N, and the rights management system 20 is coupled to the clearing house 30. Furthermore, the network N includes a network management system 40 and a terminal management system 50 which manages terminal devices connected to the network N.

Figure 3:
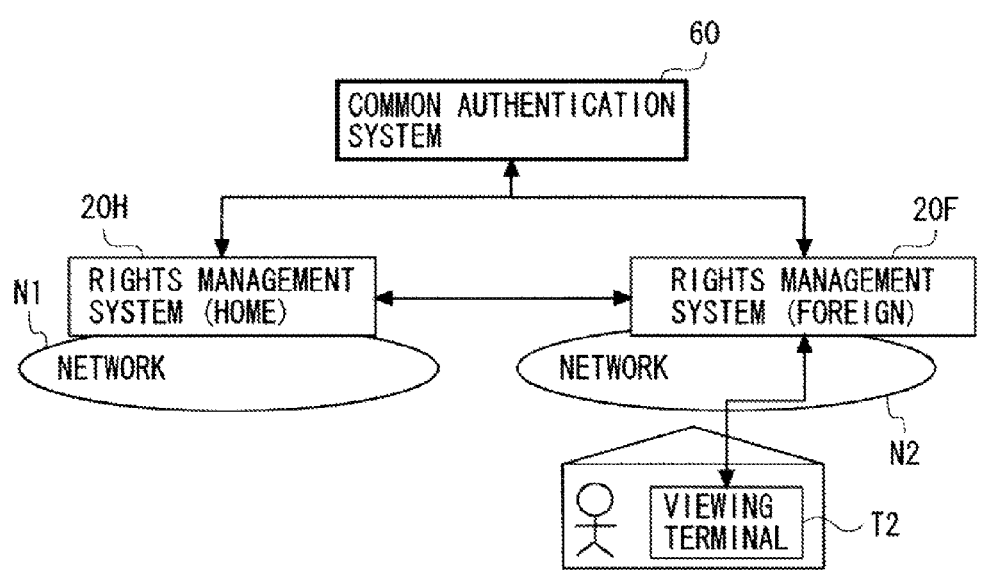
FIG. 3 is an illustrative diagram of a user authentication system in the system illustrated in FIG. 1.

FIG. 3 is an illustrative diagram of a user authentication system in the system illustrated in FIG. 1. As illustrated in FIG. 3, a common authentication system 60 which is used commonly for user authentication is provided in an upper level of the home management system 20H and the foreign management system 20F, and a user authentication request is made to the common authentication system when the foreign management system 20F is issuing a license to the terminal device T2 of the user.

Figure 4:
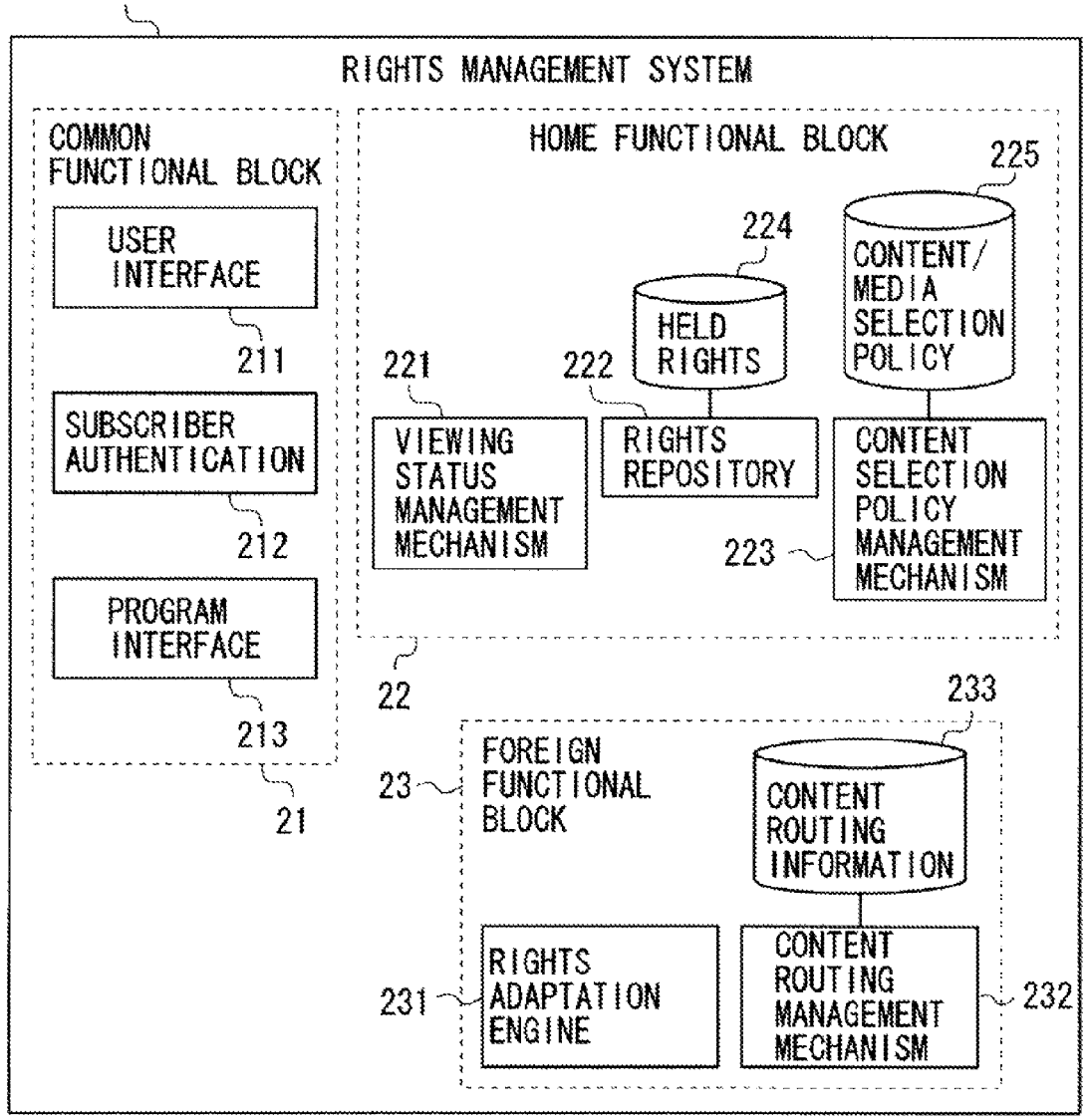
FIG. 4 is a diagram showing an example of the configuration of a rights management system which can be used as a home management system and a foreign management system illustrated in FIG. 1.

FIG. 4 is a diagram illustrating an example of a configuration of a rights management system which may be used as the home management system 20H and the foreign management system 20F illustrated in FIG. 1. FIG. 4 illustrates a functional block which is realized by an information processing apparatus which functions as a rights management system 20. The information processing apparatus which realizes the rights management system 20 may employ a special or generic computer (e.g., PC, WS, special or generic server machine). The rights management systems 20 each function as a server (rights management server) which issues a license in accordance with a content delivery request from a terminal device via a network to which the rights management system 20 is coupled.

The information processing apparatus includes: a processor (calculation device) such as a CPU (Central Processing Unit) or a DSP (Data Signal Processor); a main storage device (storage; storage medium) such as a RAM (Random Access Memory) which is used as a work area of the processor; auxiliary storage devices (storage; storage medium), such as a ROM (Read Only Memory) which stores programs and data, a hard disk drive (HDD), a disk storage medium (CD, DVD, Blu-ray disk) and a drive device; an input device for inputting information (a keyboard, a pointing device, or the like); an output device for outputting information (display; printer); a communication interface device (communication I/F) which controls communication processing (communication functions) with other devices; and an input/output device (I/O) which controls data input/output management.

A processor (microprocessor) such as a CPU or DSP realizes functions of functional blocks such as that illustrated in FIG. 4 by loading a program stored in a storage device, such as a ROM or a HD, into a RAM, and executing the program. Furthermore, various databases illustrated in FIG. 4 are created and held on at least one storage device such as a HD. However, the functional block illustrated in FIG. 4 may be realized by means of special or generic hardware (an electrical or electronic circuit, IC (integrated circuit), LSI (large-scale integrated circuit), ASIC (Application Specific Integrated Circuit), or a combination of these.

Furthermore, the functional blocks illustrated in FIG. 4 may be integrated or separated as appropriate. Moreover, the rights management systems 20 may be realized by distributed processing or parallel processing of two or more information processing apparatuses (calculation devices). The configuration of the information processing apparatuses to realize the rights management systems 20, and the conceptualization of the functional blocks can be applied to the description of the clearing house 30, the content delivery system 10, and the functional blocks of the terminal devices T (T1, T2), which is given below.

In FIG. 4, the rights management system 20 is constituted by a common functional block 21 which is provided commonly in the home management system 20H and the foreign management system 20F, a home functional block 22 to be provided in the home management system 20H, and a foreign functional block 23 to be provided in the foreign management system 20F. If the user uses the terminal device T1 in the home network N1, then the common functional block 21, the foreign functional block 23 and the home functional block 22 of the home management system 20H are used. On the other hand, if the user uses the terminal device T2 in the foreign network N2, then the common functional block 21 and the foreign functional block 23 of the foreign management system 20F, and the home functional block 22 of the home management system 20H, are used.

The home network and home rights management system differ depending on the user. Consequently, there are cases where one rights management system functions as a home management system for one user and functions as a foreign management system for another user. Therefore, all rights management systems respectively include the common functional block 21, the home functional block 22 and the foreign functional block 23.

The common functional block 21 includes a user interface 211 which receives various requests from terminal devices, a subscriber authentication unit 212 which governs user authentication processing, and a program interface 213.

The home functional block 22 is equipped with a viewing status management mechanism 221 which manages the viewing (viewing and/or listening) status of the content by the user, a rights repository 222 which manages an ownership database (ownership DB) 224, and a content selection policy management mechanism 223 which manages a content and media selection policy DB 225. The foreign functional block 23 includes a rights adaptation engine 231, and a content routing management mechanism 232 which manages the content routing information DB 233.

Figure 5:
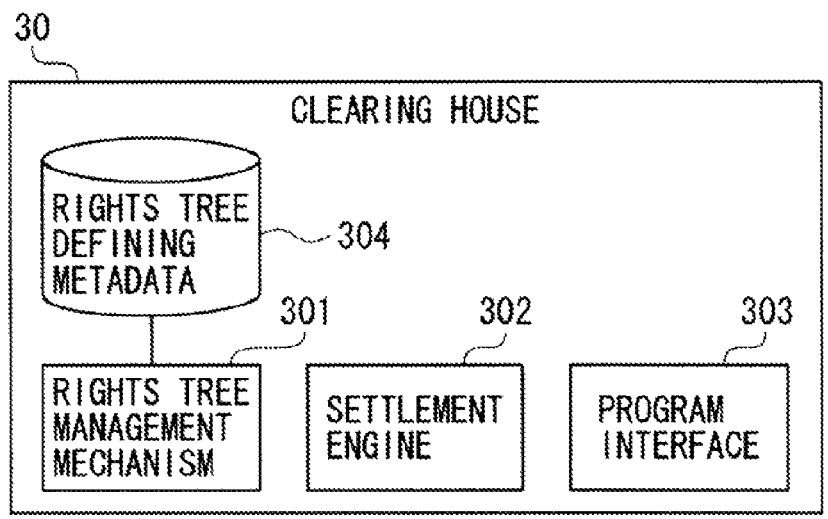
FIG. 5 illustrates an example of the configuration of a clearing house 30 illustrated in FIG. 1.

FIG. 5 illustrates an example of the configuration of a clearing house 30 illustrated in FIG. 1. The clearing house 30 is able to settle the balance (difference) between rights held by a user which are managed in the home management system 20H (including cases where the user does not hold rights), and rights relating to a content that a user wishes to use on a foreign network. The clearing house 30 is realized, for example, by one or more information processing apparatuses (server devices).

FIG. 5 illustrates, as functional blocks realized by one or more information processing apparatuses which function as a clearing house 30, a rights tree management mechanism 301 which manages a rights tree defining metadata DB 304, a settlement engine 302 which carries out settlement of amounts relating to content use by a user, and a program interface 303.

Figure 6:
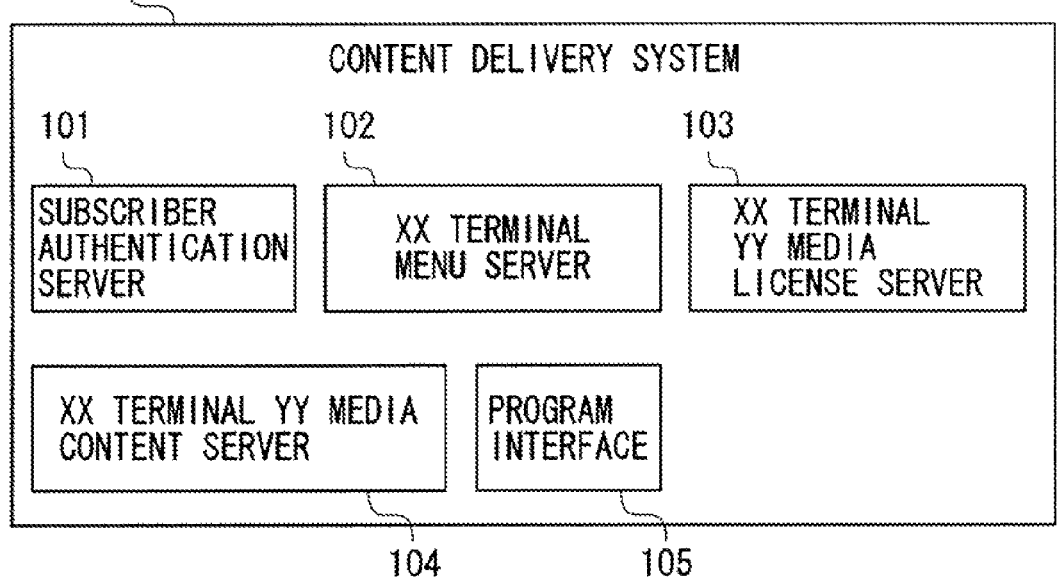
FIG. 6 illustrates an example of the configuration of the content delivery (distribution) system illustrated in FIG. 1.

FIG. 6 illustrates an example of the configuration of the content delivery system 10 illustrated in FIG. 1. FIG. 6 depicts, as functional blocks which are realized by one or more information processing devices which function as the content delivery system 10. The content delivery system includes: a subscriber authentication server 101 which governs user authentication; a menu server 102 which presents a menu relating to content delivery to a terminal device; a license server 103 which carries out licensing processing in respect of a user; a content server 104 which carries out content delivery processing in respect of a user (terminal device); and a program interface 105.

The menu server 102 can be prepared for each terminal device. The license server 103 and the content server 104 can be prepared for each terminal device and for each content media. FIG. 6 depicts, by way of example, a menu server 102, a license server 103 and a content server 104 for delivering (providing) content based on media "YY" to terminal "XX".

Figure 7:
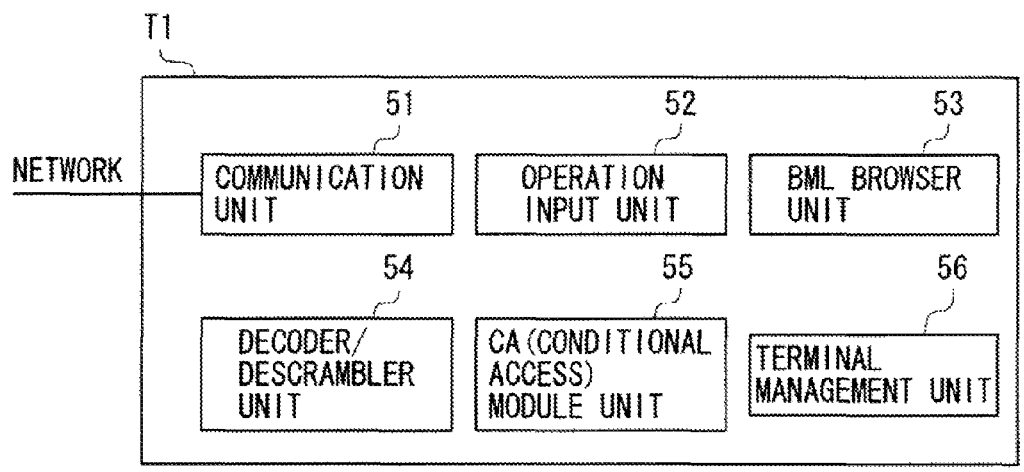
FIG. 7 illustrates an example of the configuration of a terminal device (STB) illustrated in FIG. 1.

FIG. 7 illustrates an example of the configuration of the terminal device T1 (STB) illustrated in FIG. 1. The example in FIG. 7 depicts, as functional blocks which are realized by the STB functioning as terminal device T1. The terminal device T1 includes: a communication unit 51 which governs communication processing with a network; a user operation input unit 52; and a BML browser unit 53 which carries out processing for playing (displaying) content which is defined in BML (Broadcast Markup Language). Moreover, the example in FIG. 7 also depicts: a decoder and descrambler unit (decoder/descrambler) 54 which carries out descrambling and decoding of content received by the communication unit 51; a CA module unit 55 which governs processing relating to CA (conditional access) for serving programs only to specific viewers; and a terminal management unit 56 which governs management of the terminal device T1.

Figure 8:
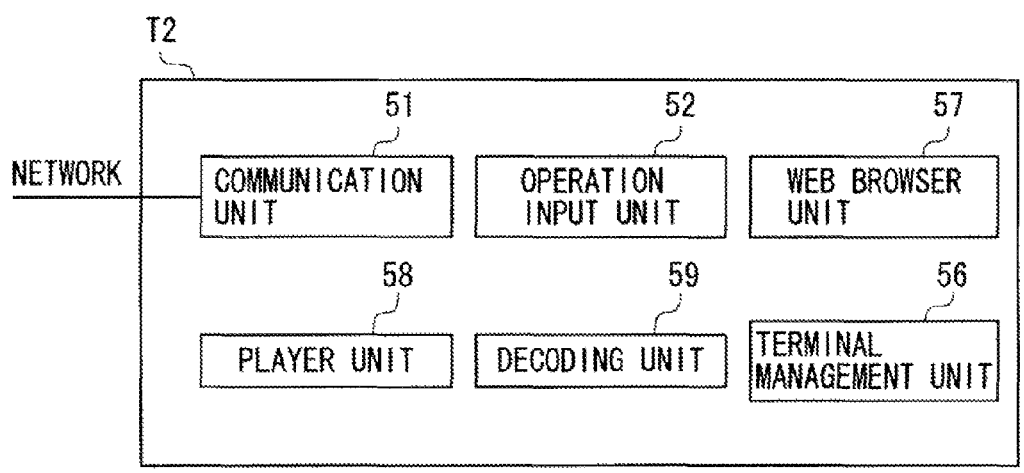
FIG. 8 illustrates an example of the configuration of a terminal device (PC) illustrated in FIG. 1.

FIG. 8 illustrates an example of the configuration of the terminal device T2 (PC) illustrated in FIG. 1. The example in FIG. 8 depicts, as functional blocks which are realized by the PC functioning as terminal device T2. The terminal device T2 includes: a communication unit 51; a user operation input unit 52; and a web (Web) browser unit 57 which carries out processing for playing (displaying) content that is defined in HTML (HyperText Markup Language). Moreover, in the example in FIG. 8, a decoding unit 59 which carries out decoding of content received by the communication unit 51, a player unit (player) 58 which carries outplaying of the decoded content file (audio file, video file, image file, or the like), and a terminal management unit 56 are depicted.

Information Managed by the Content Provision System

Next, the information managed in the content provision system described in relation to FIG. 1 to FIG. 8 will be described. FIG. 9 illustrates an example of the data structure of service continuance information which is managed by the viewing status management mechanism 211 of the home management system 20H (FIG. 4) (namely, a service continuance information table (home) 71).

The service continuance information table 71 is created in a storage area managed by the viewing status management mechanism 221. The table 71 stores content information relating to user identification information (user ID) and the viewing start timing. The content information may include, for example, a content name, a service type, a distributor (delivery provider) name, and a service name.

FIG. 10 illustrates an example of the data structure of service continuance information which is managed by the viewing status management mechanism 211 of the home management system 20H (FIG. 4) after the start of viewing in a terminal at a movement destination (terminal device T2) (namely, a service continuance information table (foreign) 71).

In the example illustrated in FIG. 10, the data structure of the table 71 is the same as FIG. 9 and the content is also the same. However, FIG. 10 depicts a situation where the service name, the distributor name and the service name have been updated due to the delivery of content by the content delivery system 10$n$ via the network N2. More specifically, the service type has been updated to video on demand (VOD), and the distributor name and service name have also been updated.

As illustrated in FIG. 9 and FIG. 10, in cases where a user wishes to continue use (viewing) of the same content or alternative content having the same source, despite a change in the network and terminal apparatus as a result of the user having moved, the viewing status management mechanism 221 of the home management system 20H is able to record the continued use situation when content is viewed at the movement destination.

FIG. 11 illustrates an example of a data structure (rights table 72) of user rights information which is stored (held) in the ownership DB 224 of the home management system 20H. A rights table 72 is created for each user and for each license, for instance. In FIG. 11, the rights table 72 stores ownership information for a user 1 (the user of the terminal devices T1 and T2). The user is specified by the user ID.

In the example in FIG. 11, the rights table 72 contains, as ownership information, license details relating to the user 1, and license issuer information. In the example illustrated in FIG. 11, the license details include information on a license for rights (obtain rights) to obtain rights in relation to content by the user 1, and information on a license for rights to use (play) content granted in association with obtain rights. The management of information (writing, reading, updating and deletion of information) relating to the rights table 72 is carried out by the rights repository 222 (FIG. 4).

Figure 12:
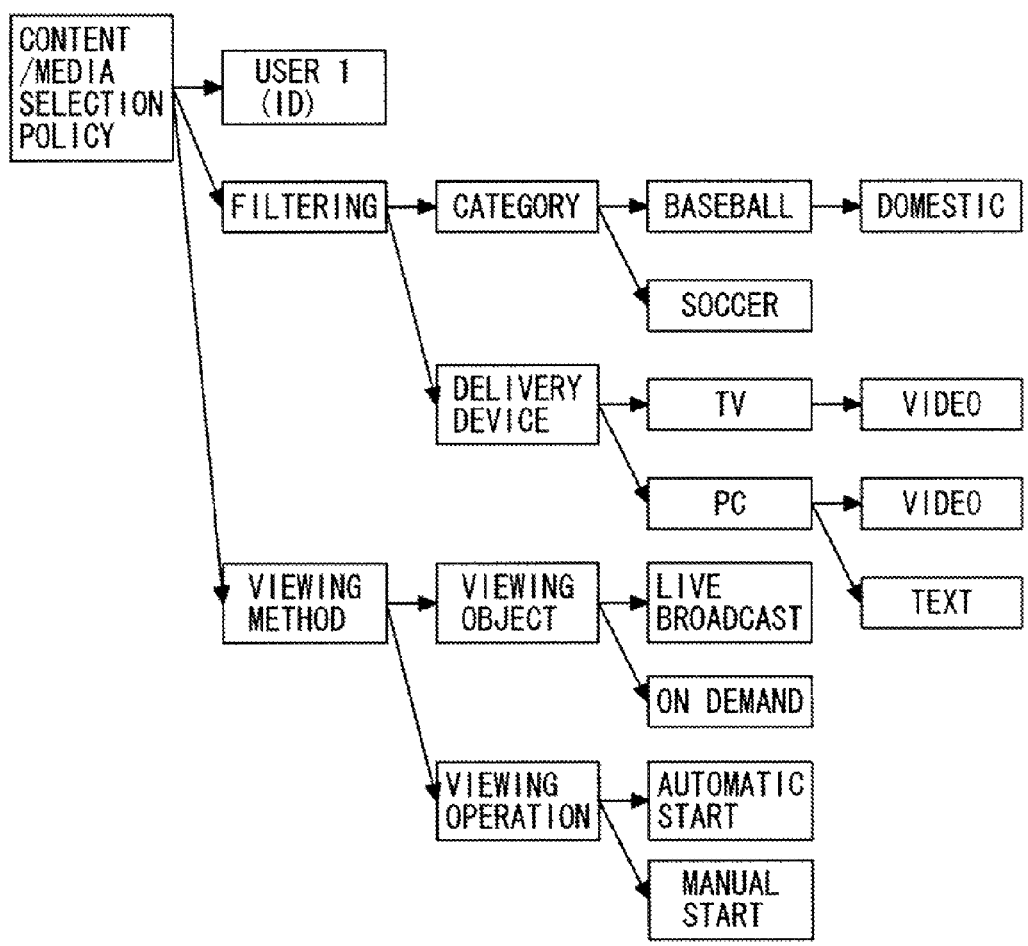
FIG. 12 illustrates a schematic view of an example of data in a content and media selection policy which is stored (held) in the content and media selection policy DB of the home management system.

FIG. 12 illustrates an example of data in a content and media selection policy which is stored (held) in the content and media selection policy DB 225 of the home management system 20H. The selection policy has a tree structure, in which lower-level nodes, "user", "filtering" and "viewing method" are arranged below the root node, "selection policy". Further, lower-level nodes are arranged below each of these nodes. The selection policy data of this kind is managed by the content selection policy management mechanism 223.

FIG. 13 illustrates an example of a data structure of content routing information to the network N1 (a routing table (home) 73), which is managed by the home management system 20H. The routing table 73 holds the following information in relation to a content name: the service type, distributor name, service name, terminal type, content media, band, and network congestion/failure information.

The table 73 is stored (held) in the content routing information DB 233 of the home management system 20H and management of the table 73 (reading, writing, updating and deletion of information) is carried out by the content routing information management mechanism 232.

FIG. 14 illustrates an example of a data structure of content routing information to the network N2 (a routing table (foreign) 74), which is managed by the foreign management system 20F. The routing table 74 has the same data structure as the table 73 and is stored (held) in the content routing information DB 233 of the foreign management system 20F and management of the table 74 (reading, writing, updating and deletion of information) is carried out by the content routing information management mechanism 232.

FIG. 15 illustrates an example of a data structure of terminal profile information which is managed by the terminal management system 50 (a terminal management table 75). The terminal management table 75 holds a terminal type, player type (player software type), renderer, permission delivery band, corresponding media, and viewing method, in association with an ID which is unique to the terminal.

FIG. 16 illustrates a schematic view of rights tree defining metadata which is managed by the clearing house 30 (FIG. 1 and FIG. 5). The metadata has a tree structure in which the original content is the root node, and the rights details are defined in the lowest-level nodes.

In the example illustrated in FIG. 16, the original content (professional baseball game) forms the root node and the service type (content delivery format (for example, television broadcast, VOD, text relay)) is defined in the subsequent nodes. The service type can also include an audio broadcast and audio delivery. The subsequent nodes to the nodes defining the delivery format describe the content delivery mode or the delivery provider (for example, CATV-A, distributor A). Moreover, the nodes subsequent to the respective nodes describing the delivery mode define information indicating the content delivery site (for example, channel 1, AA on demand) or media.

Nodes indicating rights details are provided subordinately to each of the nodes defining a delivery site. For instance, a node indicating the rights details, "play", is provided subordinately to a path of "television broadcast"-"CATV-1"-"channel-1". Alternatively, a node defining the rights details "play" and a node defining the rights details "print" are provided subordinately to a path of "text relay"-"distributor B"-"CC sports". The entries "(Rnn)" (where nn is a number) illustrated on the right-hand side of the nodes stating the rights details indicate a identification information (code) for the rights details.

The rights details (license target) do not only relate to use of the content and also include the right to obtain rights to use the content (obtain rights). Nodes relating to obtain rights of this kind are arranged directly below the original content node (root node) in the example in FIG. 16. The rights details "obtain" (obtain rights) includes rights details relating to use of the content. In the example in FIG. 16, rights for obtaining the rights "R11" and "R12" (obtain rights 1 (for example, code "RA")) and rights for obtaining "R11" and "R21" (obtain rights 2 (for example, code "RB")) are specified.

A user who has obtained a license for obtain rights 1 obtains, in respect of original content, rights (R11) to play content (CATV broadcast) provided by CATV-A via channel-1 and rights (R12) to play content provided by CATV-B via channel-2. Therefore, the user is able to choose a site (channel) for viewing the content.

On the other hand, a user who has obtained a license for obtain rights 2 obtains, in respect of the original content, rights (R11) to play content (CATV broadcast) provided by CATV-A via channel-1 and rights (R21) to play content (VOD) provided by distributor A via AA on demand. Therefore, the user is able to choose whether to view the content having the same source (original content) by CATV, or by VOD.

By means of the rights tree defining metadata of this kind, rights details relating to the use of content obtained by processing original content is managed in a tree structure, in accordance with the service type, delivery mode (delivering entity), and delivery site (media), in relation to the original content.

Example of Operation in the Content Provision System

Next, a description is given of the operation of the respective devices when the user views content by using the terminal device T1 and then views content by using the terminal device T2, in the system illustrated in FIG. 1.

Figure 17:
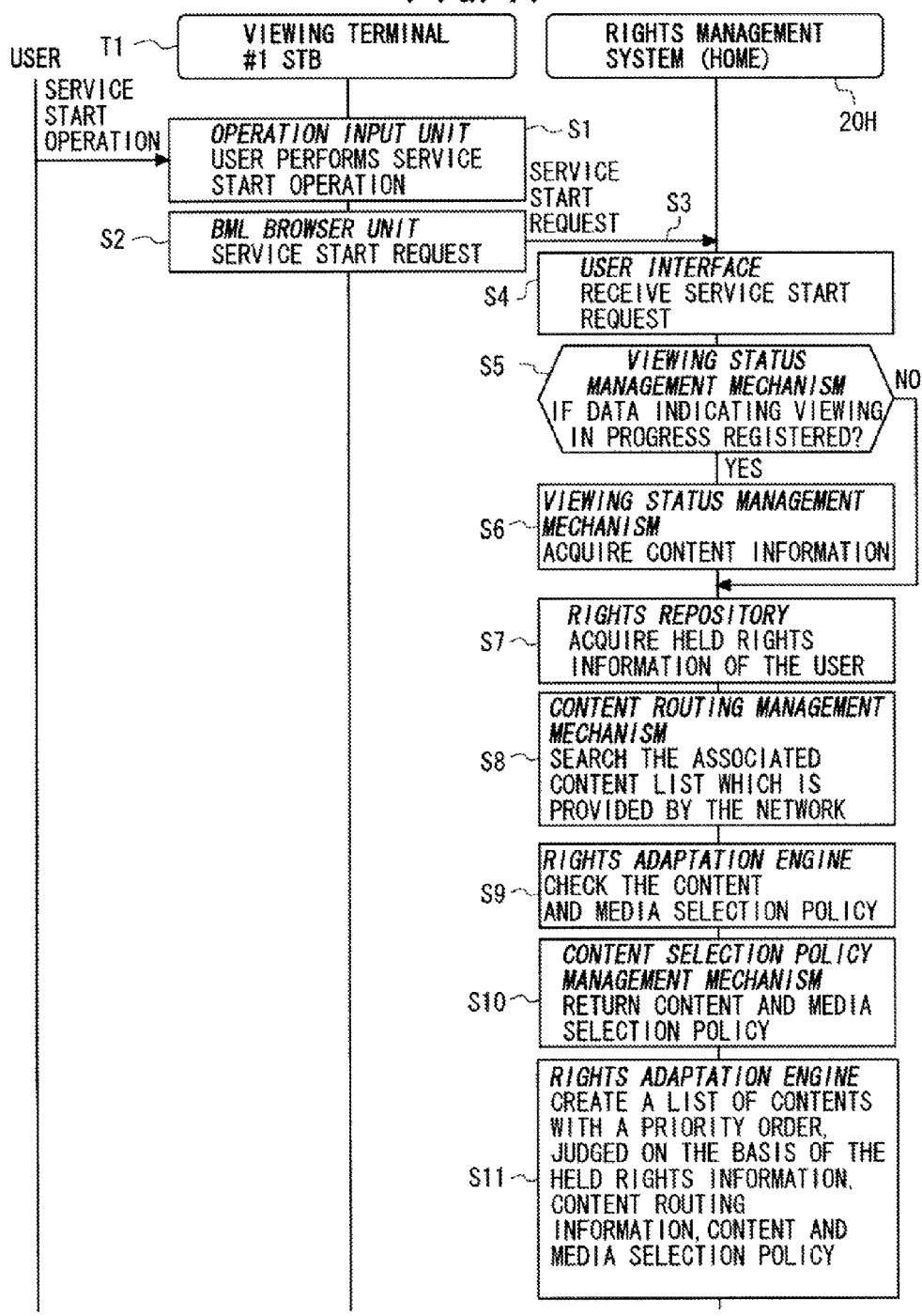
FIG. 17 is a sequence diagram showing an example of the operations and processing of respective devices in a case where a user views content by using the terminal device T1 (STB)
Figure 18:
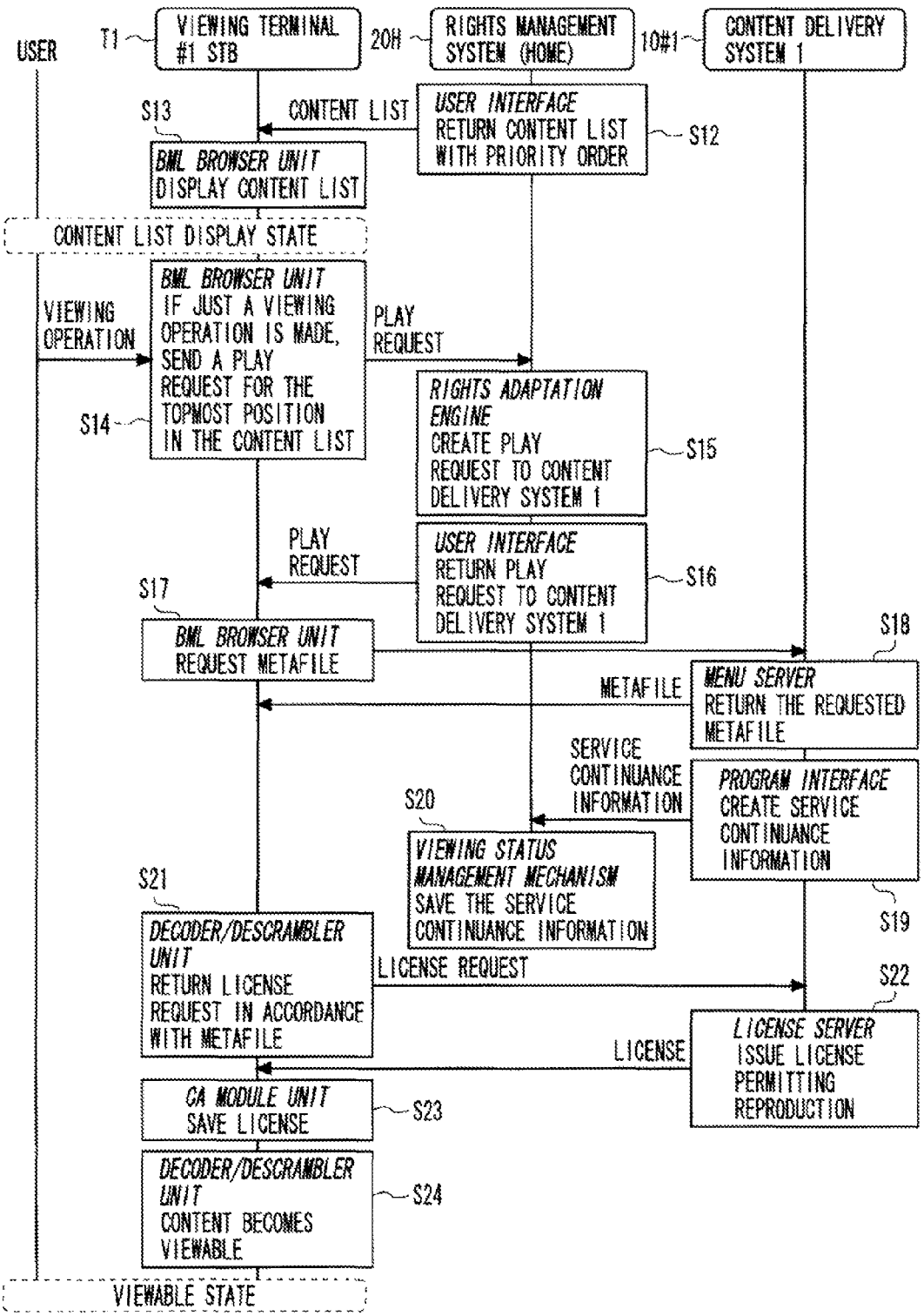
FIG. 18 is a sequence diagram following on from FIG. 17.

FIG. 17 and FIG. 18 are sequence diagrams showing an example of the operations and processing of respective devices in a case where the user views content by using the terminal device T1 (STB). In FIG. 17, when receiving provision of a content viewing service, the user performs a service start operation to the terminal device T1, using the operation input unit 52 (FIG. 7) (step S1). In so doing, the BML browser unit 52 creates a message for a service start request (step S2). The service start request message is sent from the communication unit 51 to the home management system 20H (FIG. 4) via the network N1 (step S3). The transmission and reception processing for various messages by the terminal device T1 in the following steps is carried out by means of the communication unit 51.

In the home management system 20H which has received a service start request message, the user interface 211 receives the service start request message (step S4). Accordingly, the viewing status management mechanism 221 judges whether or not data indicating viewing in progress is registered (step S5). In other words, the viewing status management mechanism 221 searches the service continuance information table 71 (FIG. 9) for a record corresponding to the user ID included in the service start request message. In this case, if there is no corresponding record (NO at S5), then the processing advances to step S7. On the other hand, if there is a corresponding record (YES at S5), then the viewing status management mechanism 221 acquires the content information in the record (step S6), and then advances processing to step S7.

At step S7, the rights repository 222 reads out the rights table 72 (FIG. 11) corresponding to the user ID, from the ownership DB 224, and acquires the ownership information for the user (information on the rights held by the user). In the embodiment, the user has the right to obtain rights to play content respectively via two different services (CATV, VOD), as illustrated in the rights table 72 in FIG. 11.

Next, the content routing management mechanism 232 searches the content routing information DB 233 for an associated content list which is provided by the network in question (network N1). For example, the routing management mechanism 232 reads out a record corresponding to the content ID in the license included in the ownership information, from the routing information DB 233, and creates a routing table 73 which illustrates an associated content list (FIG. 13).

Next, the rights adaptation engine 231 issues an enquiry to the content selection policy management mechanism 223, in order to confirm the content and media selection policy of the user (step S8). The content selection policy management mechanism 223 reads out the content and media selection policy data of the user (FIG. 12) from the content and media selection policy DB 225, using the user ID, for example (step S9).

The rights adaptation engine 231 creates a content list having a priority order, on the basis of ownership information obtained by the rights repository 222, content routing information (routing table 73) obtained by the content routing management mechanism 232, and the content and media selection policy obtained by the content and media selection policy management mechanism 223 (step S11). For example, contents for which the user has rights are extracted from the routing table 73, and a content list is created by assigning priorities corresponding to the selection policy, to the extracted contents.

Subsequently, the user interface 211 returns the content list to the terminal device T1 (step S12). When the content list is received by the communication unit 51 of the terminal device T1, the BML browser unit 53 displays the content list on the display device coupled to the terminal device T1 (a television screen or a display monitor).

By this means, the user becomes able to view the content list (content selection menu). The user is able to select a content that he or she wishes to view and/or listen, by using the operation input unit 52, and perform a viewing operation. In this case, the content which is highest (in the top position) in the priority order of the content list is selected provisionally, and if a viewer performs a viewing operation (for example, presses a selection confirmation button) without performing a content selection operation, then the BML browser unit 53 generates a play request message in relation to the content in the top position and the communication unit 51 sends this message to the home management system 20H (step S14). When a selection operation has been performed, a play request message corresponding to the selected content is transmitted.

In the home management system 20H, the rights adaptation engine 231 creates a play request message for the selected content, to the content delivery system 10 (10#1) (step S15). Thereupon, the user interface 211 returns the play request message to the terminal device T1 (step S16).

The BML browser unit 53 sends a metafile request message relating to the selected content, to the content delivery system 10#1 (step S17). The menu server in the content delivery system 10#1 returns the requested metafile (step S18). On the other hand, the program interface 213 creates a record of service continuance information (table 71, FIG. 9) (step S19). The service continuance information is sent to the home management system 204. The viewing status management mechanism 221 holds the service continuance information in a storage area managed by the mechanism 221 (step S20).

The decoder/descrambler unit 54 of the terminal device T1 sends a license request message in accordance with the metafile (step S21). The license server 103 of the content delivery system 10#1 issues a license which permits playing of the content (step S22). The license is sent to the terminal device T1.

The license is saved in the terminal device T1 (step S23). Furthermore, the decoder/descrambler unit 54 removes scrambling by descrambling the video signal of the content which is received from the content delivery system 10#1, and decodes the video signal by a decoding process (step S24). By this means, video images and sound of the content are displayed and output, from the display device, and the user is able to view the content.

FIG. 19 to FIG. 23 are sequence diagrams showing an example of the operation and processing in a case where the user halts viewing of the content using the terminal device T1, moves to the location of a terminal device T2, and wishes to continue viewing of the content which the user was viewing with the terminal device T1.

Figure 19:
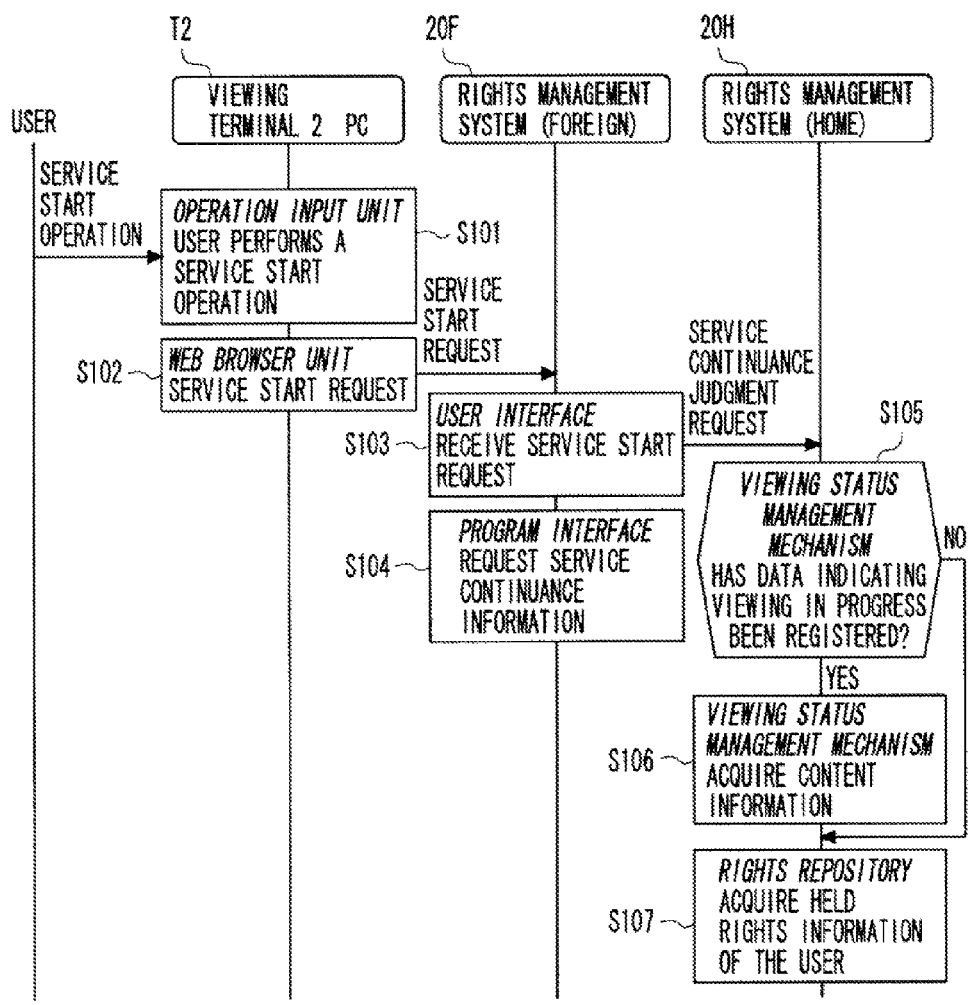
FIG. 19 is a sequence diagram showing an example of the operation and processing in a case where the user halts viewing of the content using the terminal device T1, moves to the location of a terminal device T2, and wishes to continue viewing of the content which the user was viewing with the terminal device T1.
Figure 20:
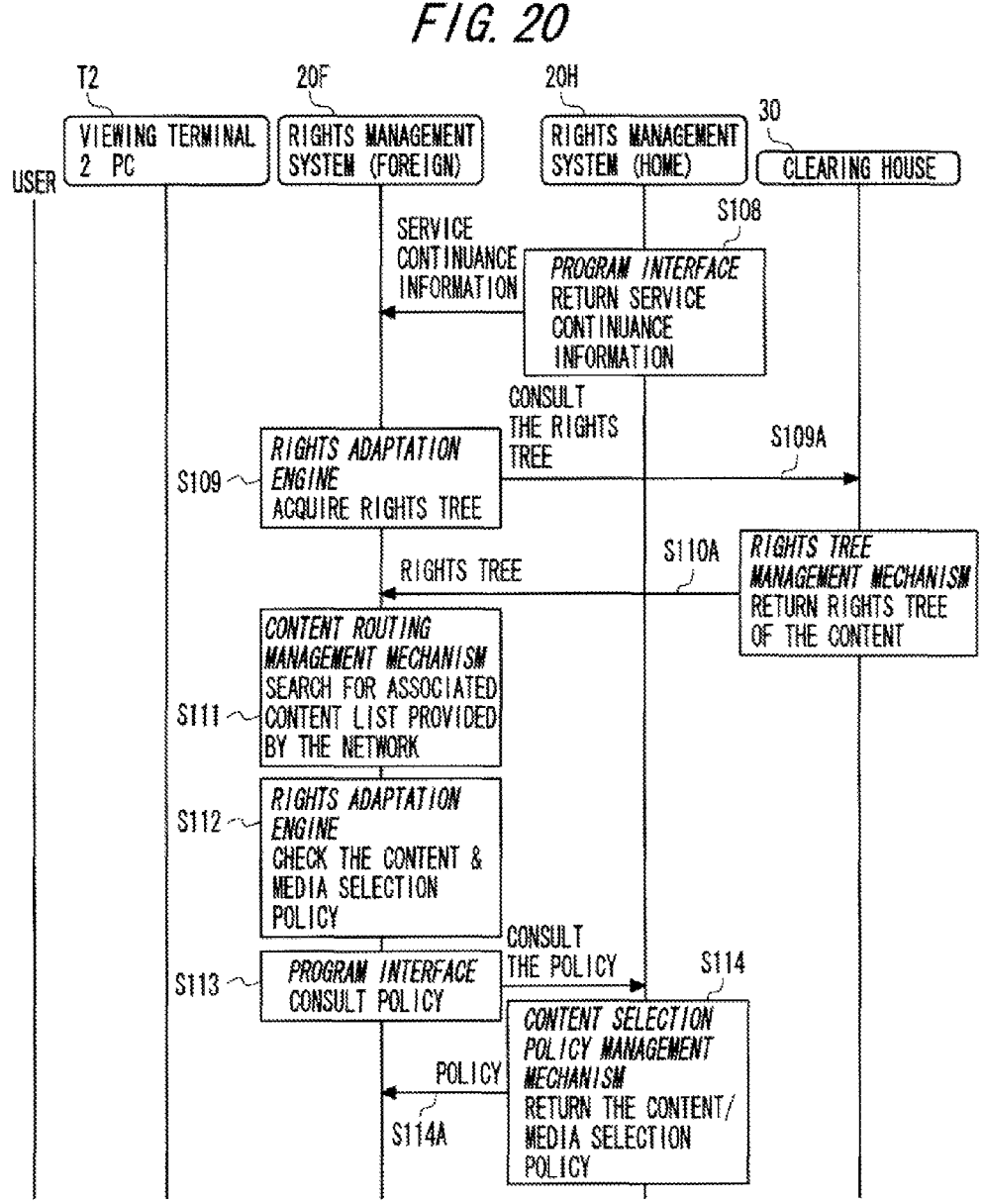
FIG. 20 is a sequence diagram following on from FIG. 19.
Figure 21:
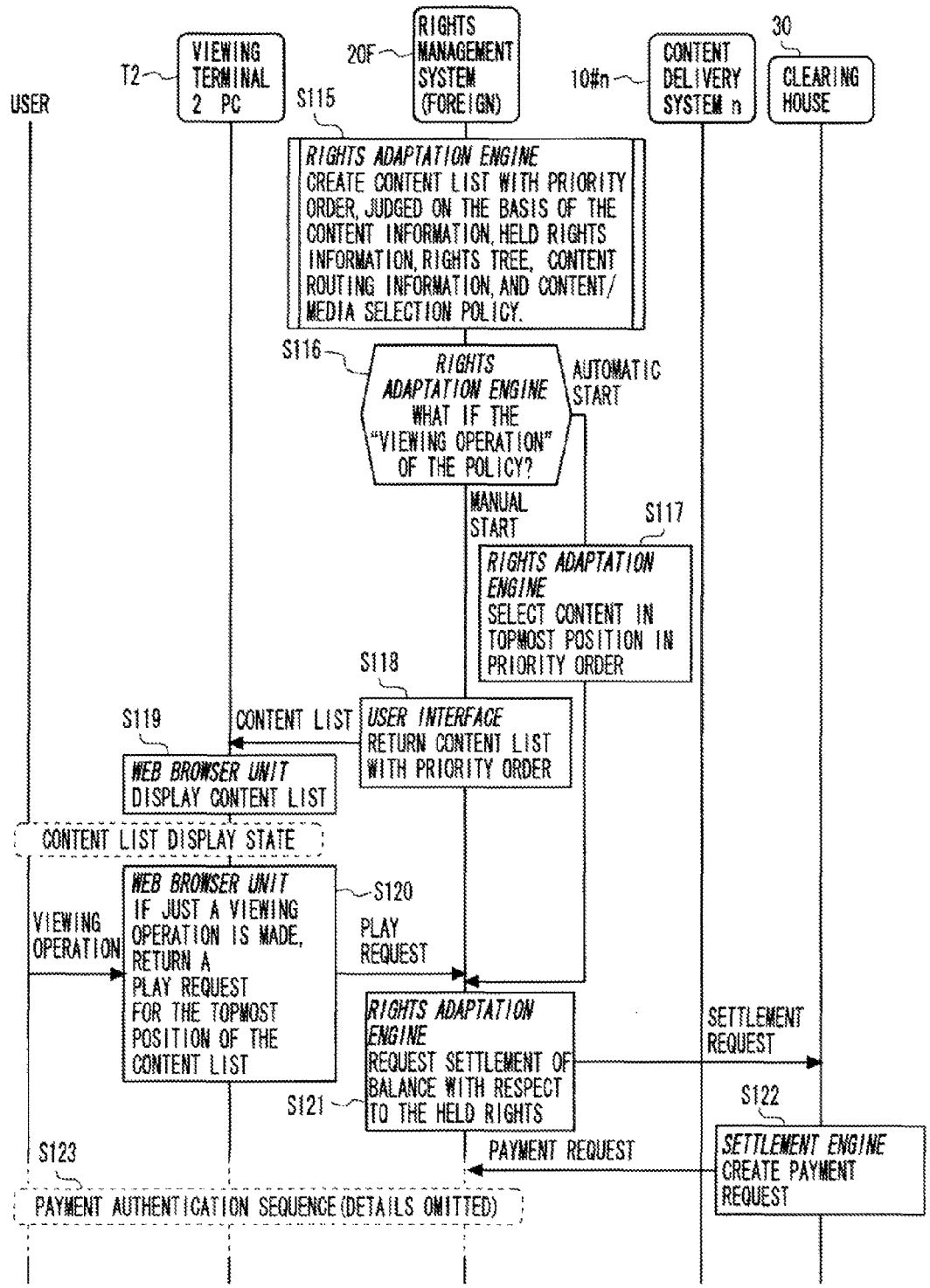
FIG. 21 is a sequence diagram following on from FIG. 20.
Figure 22:
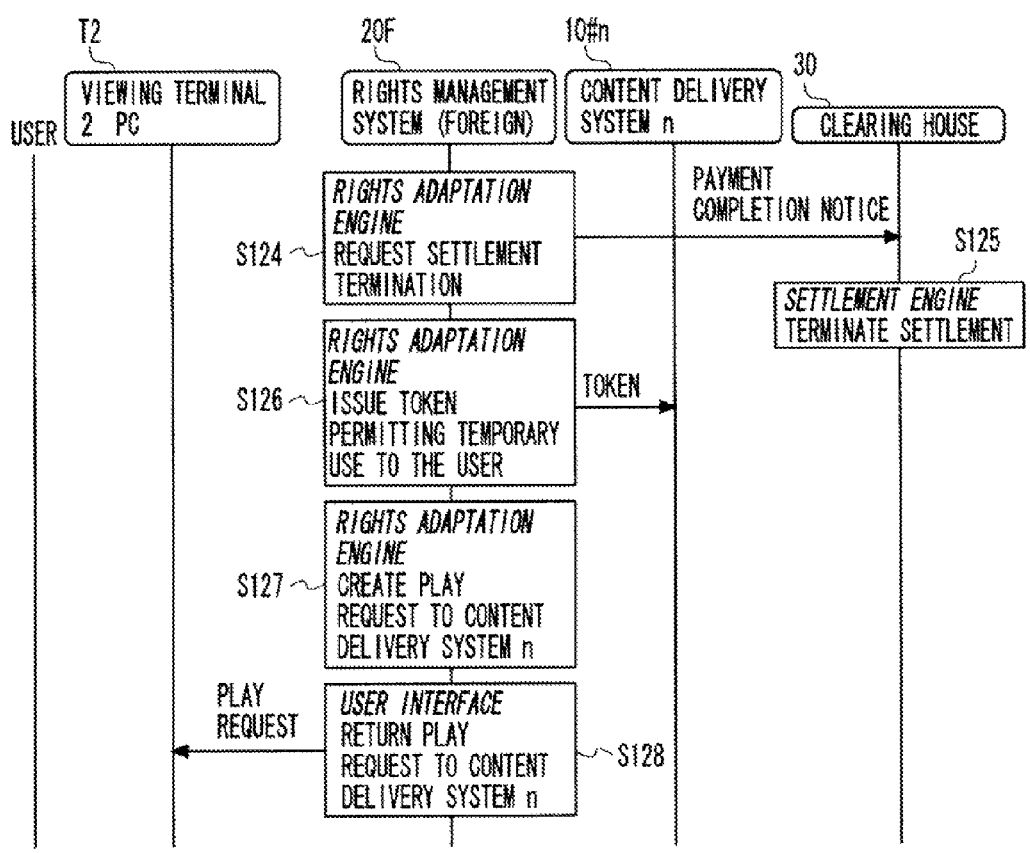
FIG. 22 is a sequence diagram following on from FIG. 21.
Figure 23:
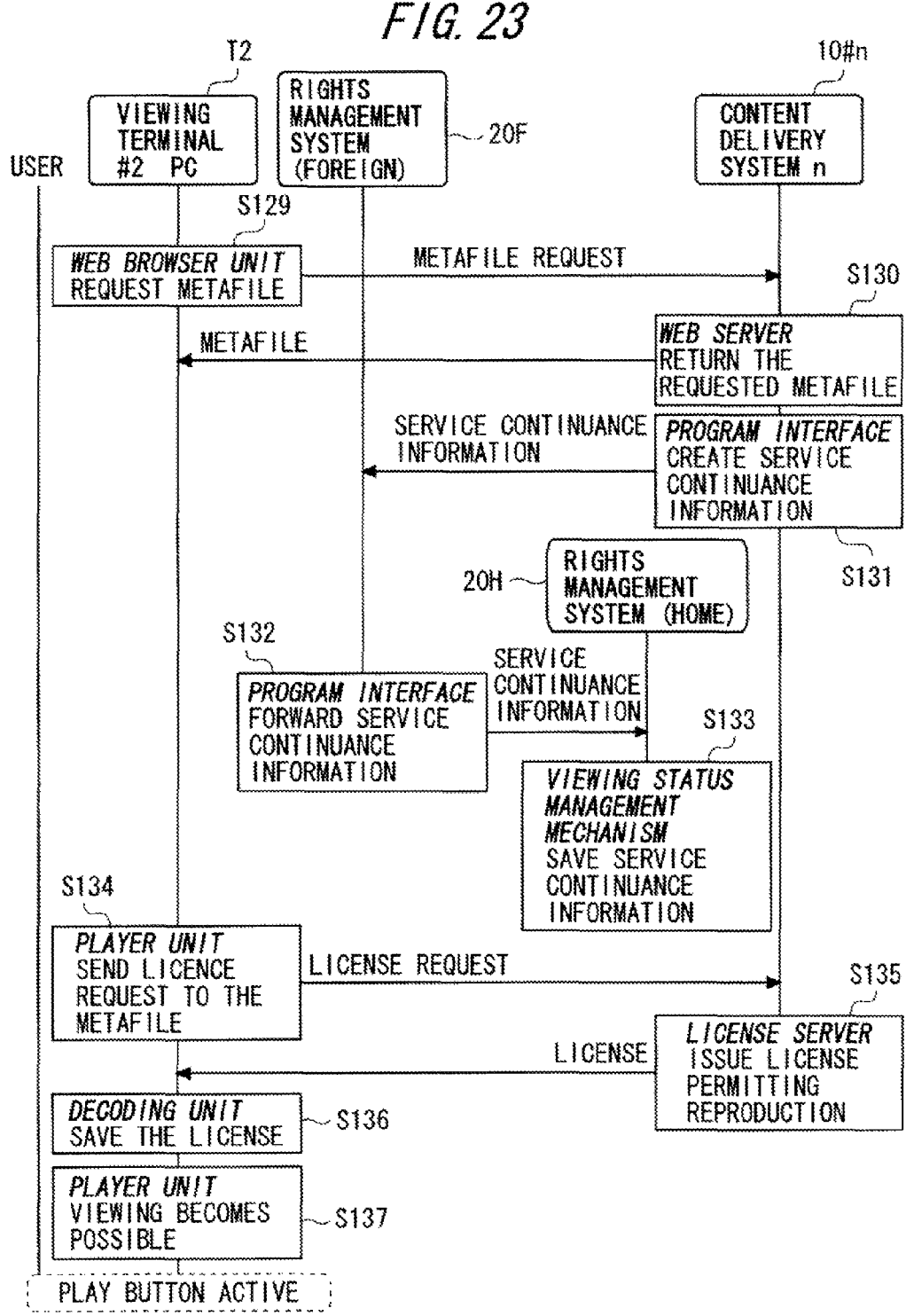
FIG. 23 is a sequence diagram following on from FIG. 22.

In FIG. 19, when the user performs a service start operation using the operation input unit of the terminal device T2 (step S101), the web browser unit 57 creates a service start request message and the communication unit 51 sends this message to the foreign management system 20F which is coupled to the network N2 (step S102). The subsequent transmission and reception processing of various messages by the terminal device T2 is carried out by means of the communication unit 51.

If the user interface 211 of the foreign management system 20F receives a service start request (step S103), then the program interface 213 sends a service continuance judgment request to the home management system 20H (step S104). The foreign management system 20F ascertains the IP address of the home management system 20H in advance, and is able to exchange information with the home management system 20H by IP communications.

In the home management system 20H, the viewing status management mechanism 221 references the service continuance information (table 71, FIG. 9) which is managed by the mechanism 221, in respect of the service continuance judgment request message, and judges whether or not data indicating that the user is in the process of viewing content has been registered (step S105). The service continuance judgment request message includes a user ID and a record containing this user ID is searched for in the table 71. In this case, a record of the service continuance information for the user which was saved at step S20 is found (YES at S105), and therefore the processing advances to step S106. On the other hand, if data (a record) indicating that viewing is in progress is not registered (saved), then the processing advances to step S107.

In step S106, the viewing status management mechanism 221 acquires content information in the record and advances processing to step S107.

At step S107, the rights repository 222 reads out the rights table 72 (FIG. 11) corresponding to the user ID, from the ownership DB 224, and acquires the ownership information for the user (information on the rights held by the user).

Thereupon, the program interface 213 creates a message including a record of service continuance information and ownership information, and returns this message to the foreign management system 20F (step S108).

In the foreign management system 20F, when the message is received, the rights adaptation engine 231 refers to the message, confirms that the content being viewed is contained in the service continuance information, and decides to acquire a rights tree relating to the content (step S109). In this case, the rights adaptation engine 231 sends an enquiry request message for a content rights tree relating to the service continuance information, to the clearinghouse 30 (step S109A).

In the clearing house 30, the rights tree management mechanism 301 (FIG. 5) which has received the enquiry request message reads out the metadata of the rights tree which matches the content ID included in the enquiry request message, from the DB 304 which stores rights tree metadata (step S110). A message including this rights tree metadata is returned to the foreign management system 20F (step S110A).

In the foreign management system 20F, the content routing management mechanism 232 searches the content routing information DB 233 for a list of associated content which is provided in the network in question (network N2) (step S111). For example, the routing management mechanism 232 creates a routing table 74 (FIG. 14) which illustrates a list of contents provided in the network N2, which are the contents defined in the rights tree (metadata). In this case, the table 74 can be designed so as to list all of the contents which originate from the original content in the rights tree. Furthermore, the table 74 can also be designed so as to include a list of alternative contents which are associated with the original content.

Next, the rights adaptation engine 231 decides to check the content and media selection policy of the user (step S113), and issues an enquiry to the content selection policy management mechanism 223 of the home management system 20H, by means of the program interface 213 sending a policy enquiry message (step S113A).

The content selection policy management mechanism 223 reads out the content and media selection policy data of the user (FIG. 12) from the content and media selection policy DB 225, using the user ID contained in the policy enquiry message, for example (step S114). The policy data is returned to the rights adaptation engine 231 of the foreign management system 20F (step S114A).

The rights adaptation engine 231 creates a content list with priority order on the basis of the ownership information obtained from the home management system 20F, the service continuance information, the content and media selection policy, the content routing information (routing stable 73), and the rights tree metadata obtained from the clearing house 30 (step S115).

In other words, it can be seen from the content information that the user is viewing content (professional baseball transmission) via a CATV network (network N1). Furthermore, it can be seen from the ownership information that the user holds rights to play content provided by CATV, and rights to receive provision of substantially the same content by VOD and to play that content. Furthermore, the source of the content which is being viewed (the original content) and the set of rights deriving from the original content can be ascertained from the rights tree metadata, and the validity of the ownership can be guaranteed since the ownership information matches the rights tree. Contents for which the user has rights and which are also stated in the rights tree are extracted from the routing table 74, and a content list is created by assigning priorities corresponding to the selection policy, to the contents thus extracted.

Thereupon, the rights adaptation engine 231 judges whether the user has "automatic start" or "manual start" as a policy, on the basis of the policy of the "viewing operation" in the policy data (step S116).

In this case, if the automatic start policy has priority, then the rights adaptation engine 231 selects the content having the highest position in the priority order (step S117) and then advances processing to step S121. On the other hand, if the manual start policy has priority, then the user interface 211 sends a content list to the terminal device T2 (step S118).

In the terminal device T2, the web browser unit 57 displays the content list on the display device (display monitor) (step S119). By this means, the user becomes able to reference the content list.

The user is able to select a content that he or she wishes to view, by using the operation input unit 52, and perform a viewing operation. In this case, the content which is highest (in the top position) in the priority order of the content list is selected provisionally, and if a viewer performs a viewing operation without performing a content selection operation, then the web browser unit 57 generates a play request message in relation to the content in the top position and sends this message to the foreign management system 20F (step S120). When a selection operation has been performed, a play request message corresponding to the selected content is transmitted.

In the foreign management system 20F, the rights adaptation engine 231 requests settlement of the balance with respect to the ownership, to the clearing house 30 (step S121). The settlement engine 302 (FIG. 5) of the clearing house 30 generates a payment demand and sends the demand to the foreign management system 20F (step S122), and a payment authentication sequence is carried out between the terminal device T2 (user) and the foreign management system 20F (step S123).

Thereafter, the rights adaptation engine 231 sends a payment completion notice indicating that payment of the balance relating to the user has been completed, to the clearing house 30 (step S124). The settlement engine 302 of the clearing house 30 terminates the settlement processing upon receiving the payment completion notice (step S125). In this way, when a user continues viewing content, the balance produced by the difference in the content delivery service is settled.

Thereupon, the rights adaptation engine 231 issues a token which permits temporary use of the content by the user, and sends this token to the content delivery system n10#n (step S126). Subsequently, the rights adaptation engine 231 creates a play request for the selected content to the content delivery system 10#n in the network N2 (step S127). The user interface 211 sends a play request to the terminal device T2 (step S128).

Accordingly, the web browser unit 57 of the terminal device T2 sends a metafile request message relating to the selected content, to the content delivery system 10#n (step S129). The web server 102 in the content delivery system 10#n returns the requested metafile (step S130). Meanwhile, the program interface 213 creates a record of service continuance information (step S131). The service continuance information is sent to the foreign management system 20F. The program interface 213 transfers the service continuance information to the home management system 20H (step S132). The viewing status management mechanism 221 holds the service continuance information in a storage area managed by the mechanism 221 (step S133, table 71, FIG. 10).

The player unit 58 of the terminal device T2 sends a license request message in accordance with the metafile, to the content delivery system 10#n (step S134). The license server 103 of the content delivery system 10#n issues a license which permits playing of the content (step S135). The license is sent to the terminal device T2.

In the terminal device T2, the decoding unit 59 saves the license (step S136). Furthermore, the decoding unit 59 carries out decoding of a moving image file of the content received from the content delivery system 10#n, in accordance with the license (step S137). By this means, a play button for the moving image of the content is displayed on the display device of the terminal device T2 (step S137), and playing of the content is started by pressing (clicking) on the play button. In this way, the user is able to continue viewing content by pressing the play button.

Figure 24:
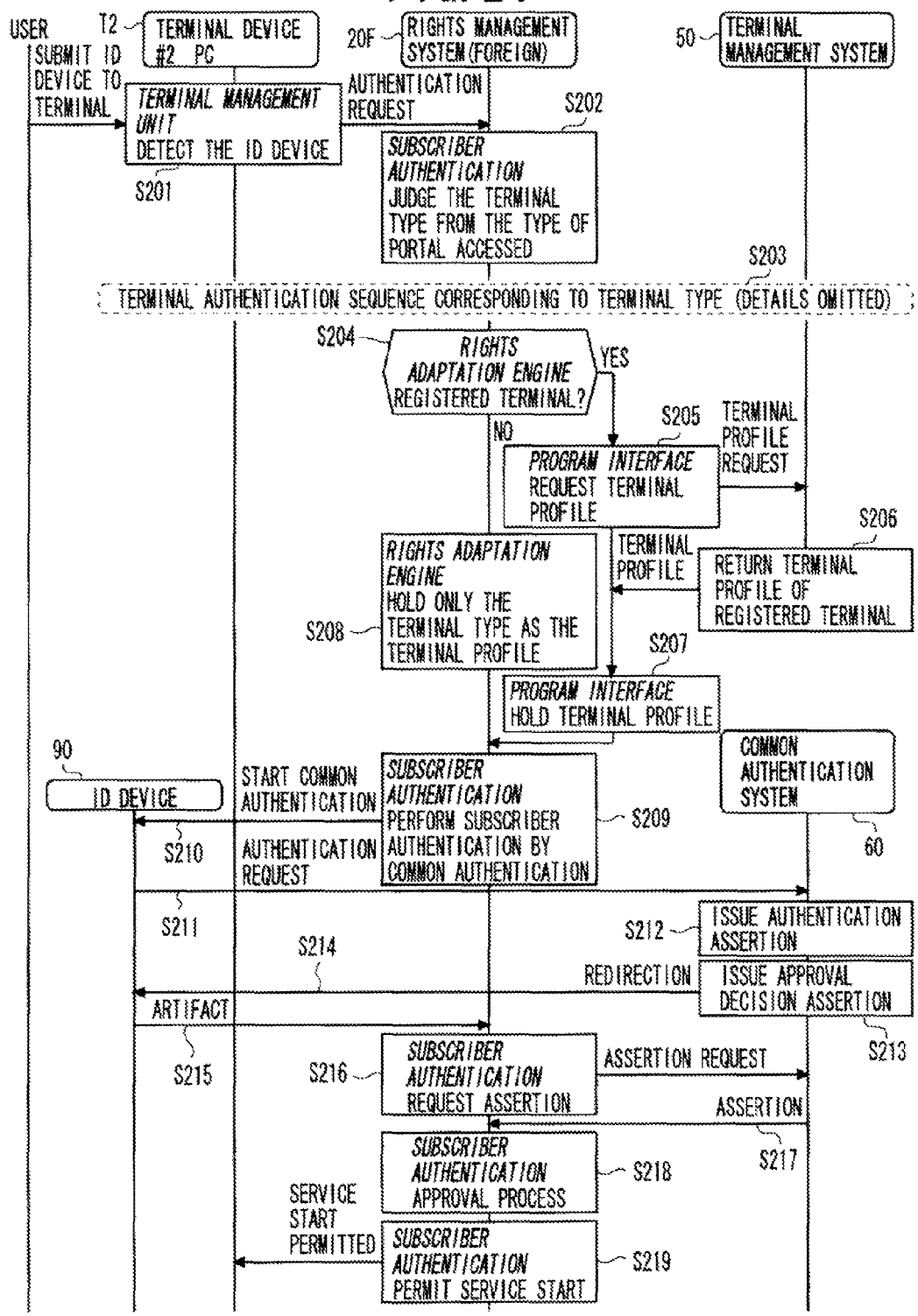
FIG. 24 is a diagram depicting an example of a sequence of terminal authentication and subscriber authentication which is carried out prior to the operational example illustrated in FIG. 19 to FIG. 23.

FIG. 24 is a diagram illustrating an example of a sequence of terminal authentication and subscriber authentication which is carried out prior to the operational examples illustrated in FIG. 19 to FIG. 23. In the processing illustrated in FIG. 24, the user possesses an ID device 90 (for example, an IC card) having an ID for subscriber authentication which is used when viewing content, and the ID device is detected by the terminal management unit 56 of the terminal device T2 when installed in or connected to the terminal device T2, or by non-contact or near field communications (step S201). Accordingly, the terminal management unit 56 sends a terminal authentication request message to the foreign management system 20F.

The subscriber authentication unit 212 of the foreign management system 20F judges the terminal type by the type of portal which has been accessed (step S202). Thereafter, a terminal authentication sequence corresponding to the terminal device is carried out via the rights management system between the terminal device T2 and the terminal management system on the network N2 (step S203).

Thereupon, the rights adaptation engine 231 of the foreign management system 20F judges whether the terminal device T2 is a registered terminal which has been registered in the terminal management system 50 (step S204), and if the terminal is not a registered terminal (NO at S204), then only the terminal type is held in the terminal profile and processing advances to step S209.

On the other hand, if the terminal device T2 is a registered terminal, then the program interface 213 of the foreign management system 20F sends a terminal profile request message to the terminal management system 50 (step S205). The terminal management system 50 sends the terminal profile of the terminal device T2 to the foreign management system 20F (step S206).

The program interface 213 of the foreign management system 20F holds the terminal profile (step S207). In this way, the foreign management system 20F holds the terminal profile of the terminal device T2 (FIG. 15; terminal table 75).

Thereupon, the subscriber authentication unit 212 carries out subscribed authentication by common authentication (step S209). The subscriber authentication unit 212 sends a common authentication start message to the ID device 90 (step S210).

Upon receiving the common authentication start message, the ID device 90 sends a subscriber authentication request to the common authentication system 60 (step S211). Before this communication, the ID device 90 already knows the address of the common authentication system 60 (for example, the IP address).

Upon receiving the authentication request, the common authentication system 60 issues an authentication assertion (step S212) and also issues an approval decision assertion (step S213). Thereupon, the common authentication system 60 sends a redirection message to the ID device 90 (step S214).

The ID device 90 sends an artifact to the foreign management system 20F in response to the redirection (step S215). Accordingly, the subscriber authentication unit 212 sends an assertion request to the common authentication system 60. The common authentication system 60 returns an assertion to the foreign management system 20F in accordance with the assertion request (step S217), the subscriber authentication unit 212 carries out a subscriber approval process (step S218), and the start of service is permitted (step S219). By this means, an approval message is supplied to the terminal device T2, and in accordance with a service start operation, the terminal device T2 sends a service start request to the foreign management system 20F (the processing in FIG. 19 to FIG. 23 becomes possible).

Figure 25:
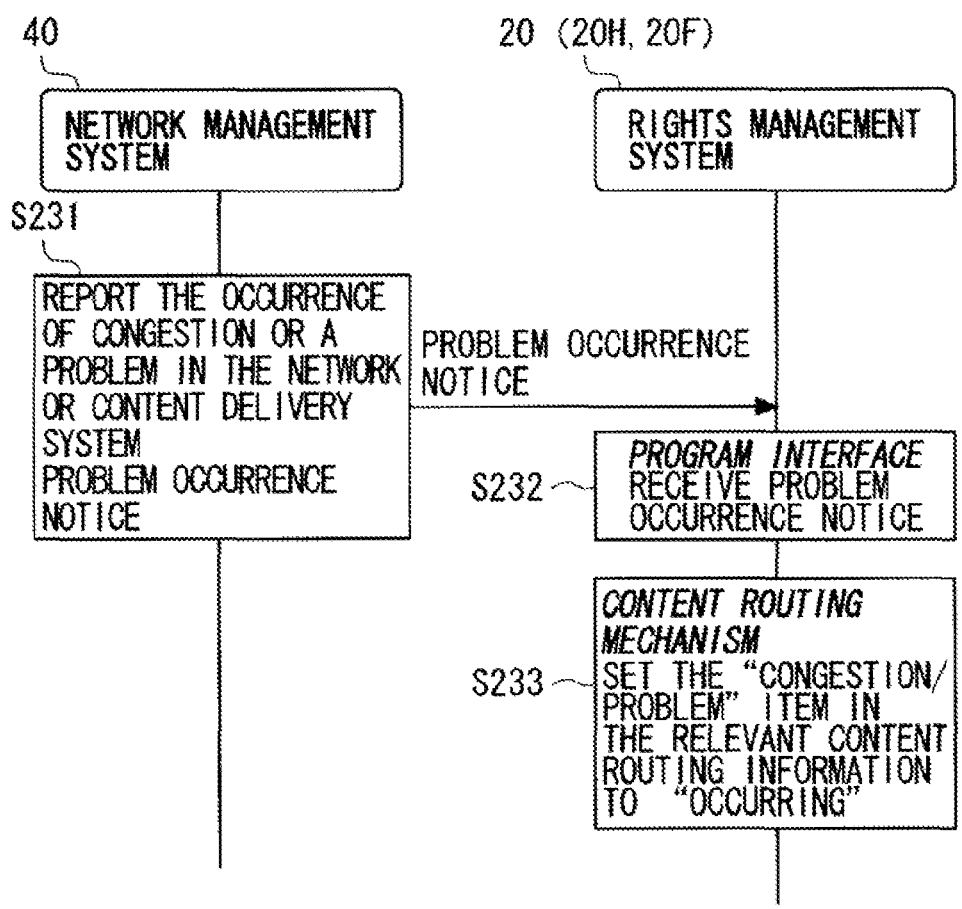
FIG. 25 illustrates an example of a sequence in a case where a "congestion/failure" item in the content routing information (FIG. 13, FIG. 14) is updated.

FIG. 25 illustrates an example of a sequence in a case where the "congestion/failure" item in the content routing information (FIG. 13, FIG. 14) is updated. In the networks N1 and N2, the network management system 40 (FIG. 3) monitors network congestion or failures, and when congestion or a failure is detected, a failure occurrence notice indicating the occurrence of congestion or a failure is sent to the rights management system 20 (20H or 20F) which is connected to the network in question (N1, N2) (step S231).

In the rights management system 20, when the program interface 213 receives a failure occurrence notice, the content routing management mechanism 232 sets the "congestion/failure" item in the content routing information corresponding to the failure occurrence notice, to "occurring" (step S233).

FIG. 26 illustrates an example of the details of the content list creation processing (FIG. 21, step S115) by the rights adaptation engine 231 (FIG. 4). In FIG. 26, the rights adaptation engine 231 compares the content information (a) in the service continuance information (FIG. 13), and the rights tree (b), and creates a list of contents having the same source (original content) as the content that the user was viewing before moving (step S401).

Thereupon, the rights adaptation engine 231 compares the results from step S401 with the N2 content routing information (FIG. 14), and creates a list of contents which have the same source as the content that the user was viewing before moving and which can be played on the network N2 (step S402). Thereupon, the rights adaptation engine 231 excludes, from the list of contents, the record of any content for which the "congestion/failure" item indicates "occurring" (step S403).

Thereupon, the rights adaptation engine 231 compares the results from step S403 with the terminal profile (d) (FIG. 15), and creates a list of contents which have the same source as the content that the user was viewing before moving and which can be viewed on the terminal device in the terminal profile (step S404).

Thereupon, the rights adaptation engine 231 compares the results from step S404 with the content and media selection policy (e) (FIG. 12), and creates a list of contents which have the same source as the content that the user was viewing before moving, which can be played on the network N2, and which are assigned with priorities (step S405). Thereupon, the processing advances to step S116.

Action and Beneficial Effects of the Embodiment

In the embodiment, a first content provision system which provides content to a terminal device T1 (first terminal) via a network N1 (first network) is provided with a home management system 20H in which rights relating to content, for example, rights for playing, printing and obtaining of content, and the like, are stored in an ownership DB 224 on a storage medium, and a content delivery system 10#n which provides content by issuing a license in respect of particular content (first content), via the network N1, in accordance with an instruction from the home management system 20H based on a service request from the terminal device T1.

Meanwhile, in the embodiment, there is a second content provision system which provides content to a terminal device T2 belonging to a network N2 (second network) which is different from the network N1, via the second network, by licensing the use of content in accordance with a service request from the terminal device T2. The second content provision system includes a foreign management system 20F and a content delivery system 10#n.

A user of the terminal device T1 which has received a license in respect of the user of first content sent via the network N1 and which has a function for exercising rights, is able to send a service request to the second content provision system using the terminal device T2 (second terminal), while using the first content by means of the terminal device T1 or while having interrupted use of the first content.

In this case, the foreign management system 20F included in the second content provision system is able to receive service continuance information relating to the first content and ownership information for the user, by accessing the home management system 20H. By using at least this service continuance information and ownership information, second content is specified, this second content being the same content as the first content or alternative content for the first content, which can be supplied to the terminal device T2 via the network N2 and can be used in the terminal device T2 (content for which there is a function to exercise rights). The content delivery system 10#n included in the second content provision system issues a license in respect of the use of the second content, to the terminal device T2, and delivers (provides) the second content to the terminal device T2 via the network N2, in response to a request from the foreign management system 20F.

By this means, in the network N2 which is the network at the movement destination of the user, even if the first content is not delivered by the same delivery provider, and the same content is not delivered by an associated delivery provider, the user is still able to use second content which is alternative content for the first content. In this case, the second content can employ alternative content which is matched to the interests and preferences of the user.

Furthermore, according to the content provision system of the embodiment, the (adaptation engine 231 of the) foreign management system 20F included in the second content provision system is able to create a list of contents which includes (states) one or more contents which are candidates for the second content, and to supply this list to the terminal device T2. Therefore, the user is spared the task of finding the same content which can be used in the network at the movement destination (network N2), by using the device at the movement destination (terminal device T2).

Moreover, simply by means of the user selecting content which can be specified as second content, from the content list, a license in respect of the use of the second content is issued automatically by the network, and supply of the second content can be started. Consequently, the user is able to perform a license acquisition procedure for using (viewing) the second content, by means of a simple selection operation.

In this way, according to the content provision system relating to the embodiment, it is possible to improve the convenience of the use of content spanning over different networks.

Furthermore, in the content provision system relating to the embodiment, when license information (ownership information) is transferred between content rights management systems 20, it is possible to manage information by using a content consumer identifier or ownership identifier as an identification key for information search.

Moreover, in the content provision system relating to the embodiment, when information is transferred between content rights management systems 20, it is possible to transfer at least one of the type of media (for example, video, text, audio only, etc.), the type of rights (for example, play, print, obtain, etc.), and the validity period, and the like, of the first content which was provided to the terminal device T1. The information can be transferred at fixed intervals or at an appropriate timing (for example, when the validity period expires). The information transferred in this way is used in specifying the second content.

Moreover, in the content provision system relating to the embodiment, a plurality of rights management systems 20 are provided, information (service continuance information, ownership information, selection policy) is managed in a distributed fashion, and information is transferred by communications between the rights management systems 20. For example, the rights management systems 20 are respectively set to IP addresses previously designated by the operators running the network N1 and the network N2, and each of the rights management systems 20 can hold an IP address list which includes all of the IP addresses of the plurality of rights management systems 20. In this case, all of the foreign management systems 20F are able to consult user information which is held by the home management system 20H, in other words, service continuance information, ownership information and a content and media selection policy. By this means, it is possible to achieve continued use of content over different networks, and to select content which matches a user's interests and preferences.

Furthermore, in the content provision system relating to the embodiment, when second content which matches the capabilities (characteristics) of the terminal device T2 and matches the user's preferences is selected automatically, it is possible to make a selection which takes account of the terminal type, the player/renderer, the content delivery band, the content media type, the viewing method, and the like.

For example, if the terminal device T2 is a registered terminal, as in the sequence example illustrated in FIG. 24, then a terminal profile is obtained from the terminal management system 50. Thereupon, only content which can be used (viewed) by the terminal device T2 is selected, as illustrated in step S404 of FIG. 26, on the basis of the terminal type, player/renderer, delivery waveband, media type and viewing method of the terminal device T2 which is included in the terminal profile, or by using the terminal type only if the terminal is not a registered terminal. Content which matches the user's preferences is selected by means of the content and media selection policy (FIG. 12), as indicated in step S405.

Furthermore, in the content provision system relating to the embodiment, it is also possible to transfer license information for a video portion only, or an audio portion only, in accordance with the capabilities (characteristics) of the terminal device T2. For instance, by extracting content (a record) corresponding to the type of the terminal device T2, through management of the content routing information as illustrated in FIG. 14, it is possible to ensure that second content which takes account of the services that are compatible with the movement destination network is selected.

Moreover, in the content provision system relating to the embodiment, if information is transferred between rights management systems in relation to a content delivery system group in which a plurality of content delivery systems 10 are present and the same contents are stored in each system, then it is possible to specify second content which takes account of the presence or absence of failures in the network path from the content delivery system to the terminal device T2, or the network traffic situation (the presence or absence of congestion), and the like.

For example, as illustrated in FIG. 25, the "congestion/failure" item of the content routing information illustrated in FIG. 14 is updated by the reporting of failure and congestion information from the network management system 40, when congestion or a failure has occurred in the network or the content delivery system. In the processing of step S403 illustrated in FIG. 26, the content in question is excluded from the candidates for the second content. By this means, it is possible to provide second content from a suitable content delivery system 10 (a content delivery system which does not have a failure or congestion).

Furthermore, in the content provision system relating to the embodiment, the access rights of the rights management system (home) are delegated to the rights management system (foreign), in order to be able to carry out information transfer between the rights management systems 20. This is achieved as follows: when a user signs on to the rights management system (foreign) 20F, in order that the rights management system (foreign) 20F can acquire access rights to the rights management system (home) 20H, an approval decision assertion for access rights to the rights management system (home) 20H is obtained from the common authentication system 60 which is used commonly by the rights management systems, as illustrated in FIG. 24.

Moreover, in the content provision system relating to the embodiment, when information transfer is performed between the rights management systems 20, content of a media which is different from the media of the first content and which has the same source as the first content is included as alternative content. By this means, if the media of a service which was used at the location before movement cannot be used in a destination network or a destination terminal, then it is possible to set content having a high priority order, of the contents of different media having the same source, in upper positions of the content list, in accordance with the rights tree and the content and media selection policy.

Moreover, in the content provision system relating to the embodiment, it is possible to achieve automatic selection of content in accordance with viewing operation preferences (selection policy) which have been established in advance by the user. For example, in step S116 in FIG. 21, if the rights adaptation engine 231 judges that the "viewing operation" item of the content and media selection policy is "automatic start", then the content in the uppermost position of the priority order is automatically selected as a second content, and processing to start viewing of the second content is carried out. In this way, by setting the viewing operation preferences of the user in the content and media selection policy in the rights management system (home) 20H, in such a manner that "continued viewing" is selected automatically, then it is possible to spare the user from performing operations.

According to the content provision system of the embodiment, for example, when a user travels to a work assignment destination while viewing a professional baseball transmission by CATV broadcast in his or her own house, the user can acquire a license which enables continued viewing of the content on a hotel PC after arriving at the hotel at the work assignment destination. In this case, even if the network operator and the terminal device are both different, for example, it is still possible to acquire a license for continued playing by means of a simple operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A content provision system, comprising:
a first content provision system including a processor to execute processes containing: issuing, in response to a request by a user from a first terminal belonging to a first network, a license in respect of a first content which the user has rights; and providing the first content to the first terminal via the first network; and
a second content provision system including:
a receiver to receive a request by the user from a second terminal belonging to a second network that is different from the first network;
a determiner to determine a second content being a same content as the first content or an alternative content for the first content and matching the rights of the user, wherein the second content is provided from the second network to the second terminal and can be used by the second terminal, the determiner determines the second content by using at least content information specifying the first content which is in-use or which the use has interrupted and ownership information indicating the rights of the user, and the second content provision system acquires the content information and the ownership information from the first content provision system in response to the request from the second terminal;
an issuer to issue a license in respect of the second content; and
a provider to provide the second content to the second terminal via the second network.

2. The content provision system according to claim 1, wherein the content information and the ownership information are managed using at least one of an identifier of the user and an identifier indicating the rights of the user.

3. The content provision system according to claim 1, wherein the content information and the ownership information are received from another content provision system which provides contents, via the first network, to a terminal belonging to the first network.

4. The content provision system according to claim 3, wherein the content information includes a content media type; and
the ownership information includes types of rights and a validity period.

5. The content provision system according to claim 1, wherein the determiner supplies, to the second terminal, a list of contents including one or more second content candidates, and determines, as the second content, one of the one or more second content candidates corresponding to a selection result from the second terminal.

6. The content provision system according to claim 3, wherein content selection policy information for the user is received from the other content provision system; and
the determiner provides the second content in accordance with the content selection policy information.

7. The content provision system according to claim 6, wherein the determiner creates a content list including one or more second content candidates each of which has a priority; and
the determiner selects one of the one or more second content candidates having a highest priority, as the second content, if the content selection policy information includes a policy which prioritizes automatic selection over manual selection.

8. The content provision system according to claim 1, wherein the determiner selects a second content corresponding to at least one of characteristics and a type of the second terminal.

9. The content provision system according to claim 8, wherein the determiner selects a second content having a media type corresponding to at least one of the characteristics and the type of the second terminal.

10. The content provision system according to claim 1, wherein the receiver receives congestion and/or failure information indicating at least one of congestion or a failure in a delivery path of content to be a candidate for the second content is received; and
   the determiner removes the content corresponding to the congestion and/or failure information, from candidates for the second content.

11. The content provision system according to claim 3, wherein the content provision system acquires access rights to the other content provision system in order to receive the content information and the ownership information from the other content provision system.

12. The content provision system according to claim 1, wherein the content provision system receives, from an upper-level device, information on a rights tree which defines a plurality of contents derived from a content that is a source of the first content and details of rights relating to each of the plurality of contents; and
   the determination unit compares the content information with the rights tree to create a first content list including one or more contents having a same source as the first content, compares the first content list with a group of contents which can be provided via the second network, to create a second content list including one or more contents having the same source as the first content, which can be provided via the second network, and determines the second content from the contents included in the second content list.

13. A content determination apparatus, comprising:
   a receiver to receive a request by a user from a second terminal belonging to a second network that is different from a first network to which a first terminal belongs;
   an acquirer to acquire, in response to the request, content information and ownership information from a first content provision system which issues, in response to a request by the user from the first terminal, a license in respect of a first content which the user has rights and which provides the first content to the first terminal via the first network, wherein the content information is used to specify the first content which is in-use or which the use has interrupted and the ownership information indicates the rights of the user; and
   a determiner to determine a second content that is provided from the second network to the second terminal and can be used by the second terminal, based on the content information and the ownership information, wherein the second content is a same content as the first content or an alternative content for the first content and matches the rights of the user.

14. A content determination method, comprising:

receiving, by using a processor, a request by a user from a second terminal belonging to a second network that is different from a first network to which a first terminal belongs;

acquiring, by using the processor, in response to the request, content information and ownership information from a first content provision system which issues, in response to a request by the user from the first terminal, a license in respect of a first content which the user has rights and which provides the first content to the first terminal via the first network, wherein the content information is used to specify the first content which is in-use or which the use has interrupted and the ownership information indicates the rights of the user; and determining a second content that is provided from the second network to the second terminal and can be used by the second terminal, based on the content information and the ownership information, wherein the second content is a same content as the first content or an alternative content for the first content and matches the rights of the user.

* * * * *